US011770485B2

(12) United States Patent
Kawata

(10) Patent No.: US 11,770,485 B2
(45) Date of Patent: Sep. 26, 2023

(54) IMAGE READING APPARATUS IN WHICH MEMBER TO MAKE REFERENCE MEMBER MOVE IS PROVIDED TO BE ABLE TO RETRACT

(71) Applicant: PFU LIMITED, Kahoku (JP)

(72) Inventor: Kengo Kawata, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 18/153,850

(22) Filed: Jan. 12, 2023

(65) Prior Publication Data

US 2023/0262176 A1 Aug. 17, 2023

(30) Foreign Application Priority Data

Feb. 17, 2022 (JP) .................. 2022-022975

(51) Int. Cl.
*H04N 1/00* (2006.01)
(52) U.S. Cl.
CPC . *H04N 1/00519* (2013.01); *H04N 2201/0081* (2013.01)
(58) Field of Classification Search
CPC ......... H04N 2201/0094; H04N 1/0057; H04N 1/00602; H04N 1/00604; H04N 1/00623; H04N 1/00554; H04N 1/00519; H04N 1/00551; H04N 1/00588; H04N 2101/00; H04N 1/00204; H04N 1/00559; H04N 2201/02495; H04N 1/1013; H04N 1/103; H04N 1/193; H04N 2201/3274; H04N 23/56; H04N 23/74; H04N 1/00244; H04N 1/00326; H04N 1/00968; H04N 1/1017; H04N 1/32122; H04N 1/32133; H04N 1/32778; H04N 2201/0082; H04N 2201/02402; H04N 2201/0442; H04N 2201/3226; H04N 2201/3247; H04N 2201/3264; H04N 2201/3269;
(Continued)

(56) References Cited

U.S. PATENT DOCUMENTS 5,517,332 A * 5/1996 Barry ................. H04N 1/00734
358/496
2014/0292879 A1* 10/2014 Nunokawa ........... B65H 39/042
347/16
(Continued)

FOREIGN PATENT DOCUMENTS

JP 6084272 B1 2/2017

*Primary Examiner* — Negussie Worku
(74) *Attorney, Agent, or Firm* — LEWIS ROCA ROTHGERBER CHRISTIE LLP

(57) ABSTRACT

An image reading apparatus includes a first housing, a second housing, an imaging sensor, a reference member provided to be able to move between a first position facing the imaging sensor and a second position, a cam to make the reference member move, and an abutting member provided to make the cam move. The abutting member is located at a projecting position sticking out from the first housing, to make the cam move so that the reference member moves from the first position to the second position when the second housing is closed with respect to the first housing. The abutting member is provided so as to be able to retract when the second housing is opened and closed with respect to the first housing and abuts against the cam in the state located at the projecting position.

6 Claims, 14 Drawing Sheets

(58) Field of Classification Search
CPC ............ H04N 5/222; H04N 5/64; H04N 1/00;
H04N 1/00307; H04N 1/00392; H04N
1/00411; H04N 1/0044; H04N 1/00514;
H04N 1/00543; H04N 1/00557; H04N
1/00599; H04N 1/0062; H04N 1/00925;
H04N 1/028; H04N 1/04; H04N 1/0402;
H04N 1/0411; H04N 1/0449; H04N
1/0467; H04N 1/10; H04N 1/1026; H04N
1/12; H04N 1/128; H04N 19/60; H04N
19/61; H04N 21/41407; H04N 21/422;
H04N 21/42203; H04N 21/4223; H04N
21/4316; H04N 21/47; H04N 21/478;
H04N 2201/0081; H04N 2201/0084;
H04N 2201/0089; H04N 2201/0091;
H04N 2201/0096; H04N 2201/0432;
H04N 2201/0464; H04N 2201/3225;
H04N 23/63; H04N 23/631; H04N 25/59;
H04N 25/671; H04N 25/745; H04N
25/75; H04N 25/767; H04N 25/778;
H04N 5/2628; H04N 5/445; H04N 5/76;
H04N 5/765; H04N 5/77; H04N 5/783;
H04N 5/907; H04N 7/163; H04N 9/8205;
H04N 1/00127; H04N 1/00206; H04N
1/00278; H04N 1/00355; H04N 1/00358;
H04N 1/00376; H04N 1/00567; H04N
1/00615; H04N 1/0066; H04N 1/02409;
H04N 1/03; H04N 1/036; H04N 1/1043;
H04N 1/107; H04N 1/121; H04N 1/2032;
H04N 1/32101; H04N 1/32128; H04N
1/32771; H04N 1/32776; H04N
2201/001; H04N 2201/0055; H04N
2201/0422; H04N 2201/0456; H04N
2201/0458; H04N 2201/3205; H04N
2201/3243; H04N 2201/3249; H04N
2201/3266; H04N 2201/3267; H04N
2201/327; H04N 2201/3278; H04N
23/69; H04N 3/1568; H04N 5/33; H04N
9/3105; H04N 9/312; H04N 9/317; B65H
1/04; B65H 2405/332; B65H 3/0669;
B65H 1/266; B65H 3/44; B65H 1/28;
B65H 3/66; B65H 2405/32; B65H 1/22;
B65H 2301/422548; B65H 2601/322;
B65H 2701/1131; B65H 3/0684; B65H
2402/46; B65H 2801/06; B65H 3/0653;
B65H 3/34; B65H 3/5284; B65H
2402/441; B65H 2402/54; B65H 2403/42;
B65H 2403/942; B65H 2404/133; B65H
2405/114; B65H 2405/324; B65H
2511/10; B65H 2511/12; B65H 2511/20;
B65H 2511/22; B65H 2801/39; B65H
3/063; B65H 31/02; B65H 1/12; B65H
2301/331; B65H 2301/4212; B65H
2402/32; B65H 2402/45; B65H 2402/60;
B65H 2403/411; B65H 2403/513; B65H
2404/1521; B65H 2404/7414; B65H
2405/11; B65H 7/18; B65H 1/02; B65H
1/08; B65H 2402/10; B65H 2402/31;
B65H 2403/45; B65H 2403/51; B65H
2403/72; B65H 2404/152; B65H
2404/611; B65H 2404/623; B65H
2404/632; B65H 2404/725; B65H
2405/21; B65H 2405/211; B65H
2405/212; B65H 2407/21; B65H
2408/111; B65H 2511/212; B65H
2511/24; B65H 2513/10; B65H 2513/40;
B65H 2513/50; B65H 2553/40; B65H
2553/61; B65H 2601/521; B65H 2801/03;
B65H 29/14; B65H 29/22; B65H 29/58;
B65H 29/60; B65H 3/0638; B65H 3/56;
B65H 3/565; B65H 31/24; B65H 5/06;
B65H 5/26; B65H 7/02; B65H 7/06;
B65H 7/14; B65H 7/20; B65H 85/00;
B65H 9/002; B65H 9/06; B65H 9/12;
B65H 9/14; B65H 9/18; B65H 1/14;
B65H 1/20; B65H 1/30; B65H 2220/01;
B65H 2220/04; B65H 2403/53; B65H
2404/1442; B65H 2404/612; B65H
2404/63; B65H 2405/11151; B65H
2405/111646; B65H 2405/1122; B65H
2405/11425; B65H 2405/1144; B65H
2405/115; B65H 2405/15; B65H
2405/3322; B65H 2407/20; B65H
2553/51; B65H 2601/11; B65H 2601/321;
B65H 2601/326; B65H 2801/12; B65H
29/34; B65H 3/0661; B65H 31/20; B65H
31/22; B65H 37/04; B65H 5/062; B65H
5/068; B65H 5/38; B65H 7/08; B65H
9/004; B41J 13/103; B41J 11/485; B41J
2/17513; B41J 2/17553; B41J 2/1752;
B41J 29/13; B41J 2/17509; B41J
2/17523; B41J 29/02; B41J 2/175; B41J
2002/17516; B41J 2/17503; B41J 2/1753;
B41J 2/17546; B41J 2/17526; B41J
2/17556; B41J 2/17566; B41J 11/006;
B41J 11/20; B41J 13/106; B41J 19/005;
B41J 2/17596; B41J 25/3082; B41J
11/58; B41J 13/0036; B41J 2/01; B41J
2/14201; B41J 2/155; B41J 2/16508;
B41J 2/16511; B41J 2/473; B41J 25/34;
B41J 29/38; B41J 29/393; B41J 3/445;
B41J 11/70; B41J 13/0054; B41J 13/036;
B41J 13/08; B41J 13/28; B41J 15/042;
B41J 15/06; B41J 2/04; B41J 2/165;
B41J 2/16505; B41J 2/1652; B41J
2/16523; B41J 2/16547; B41J 2/1707;
B41J 2/17506; B41J 2/17543; B41J
2/17563; B41J 2/211; B41J 2/2114; B41J
2/2146; B41J 2/255; B41J 2/305; B41J
2/32; B41J 2/44; B41J 2/45; B41J 2/47;
B41J 2002/16555; B41J 2002/17573;
B41J 2002/17576; B41J 25/001; B41J
29/023; B41J 3/28; B41J 3/36; B41J
3/46; B41J 3/60; G03G 21/647; G03G
21/1821; G03G 21/1652; G03G 15/80;
G03G 2221/1657; G03G 21/1878; G03G
2221/183; G03G 21/1633; G03G
15/0863; G03G 15/087; G03G 21/1676;
G03G 15/0856; G03G 21/1871; G03G
2221/169; G03G 21/1619; G03G
21/1842; G03G 15/0865; G03G 15/605;
G03G 21/1857; G03G 21/1885; G03G
2221/1884; G03G 15/0409; G03G
15/6529; G03G 21/1671; G03G 21/168;
G03G 15/0233; G03G 15/04072; G03G
15/0896; G03G 21/1623; G03G 21/1846;
G03G 21/185; G03G 21/1896; G03G
2221/1636; G03G 2221/1651; G03G
2221/166; G03G 2221/1678; G03G
15/0275; G03G 15/0875; G03G 15/757;

G03G 21/1803; G03G 21/1825; G03G 21/1892; G03G 2215/0872; G03G 2221/163; G03G 2221/1846; G03G 15/00; G03G 15/0435; G03G 15/06; G03G 15/065; G03G 15/08; G03G 15/0808; G03G 15/0813; G03G 15/0877; G03G 15/0893; G03G 15/2039; G03G 15/2064; G03G 15/326; G03G 15/6514; G03G 21/0029; G03G 21/16; G03G 21/1628; G03G 21/1666; G03G 21/18; G03G 21/1814; G03G 21/1867; G03G 21/206; G03G 2215/00392; G03G 2215/0802; G03G 2221/1645; G03G 2221/1654; G03G 2221/1684; G03G 2221/1687; G03G 2221/1823; G03G 2221/1892; G03G 15/0216; G03G 15/04; G03G 15/0872; G03G 15/0886; G03G 15/16; G03G 15/20; G03G 15/24; G03G 15/5008; G03G 15/6502; G03G 15/6511; G03G 15/6552; G03G 15/6564; G03G 15/6567; G03G 15/657; G03G 21/105; G03G 21/1642; G03G 21/1661; G03G 21/1685; G03G 21/169; G03G 21/1839; G03G 21/1864; G03G 2215/00016; G03G 2215/00565; G03G 2215/00713; G03G 2215/025; G03G 2215/0692; G03G 2215/1619; G03G 2221/1606; G03G 2221/1639; G03G 2221/1815

USPC .......................................................... 358/400

See application file for complete search history.

(56) References Cited

U.S. PATENT DOCUMENTS

| 2017/0142288 A1 | 5/2017 | Yoshita | |
| 2022/0234856 A1* | 7/2022 | Yoshita | B65H 7/14 |
| 2023/0014406 A1* | 1/2023 | Otsuka | B65H 7/06 |
| 2023/0059480 A1* | 2/2023 | Kakuda | B65H 5/36 |
| 2023/0176514 A1* | 6/2023 | Itabashi | G03G 21/18 |
| | | | 399/38 |

* cited by examiner

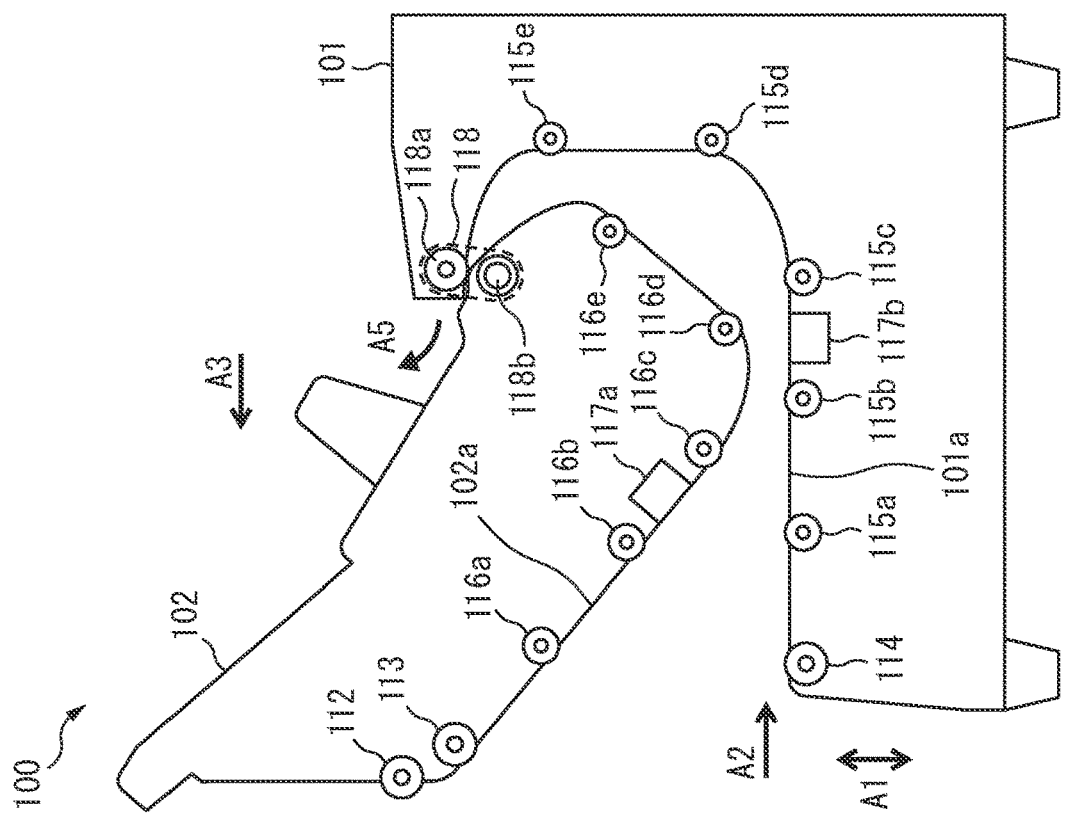
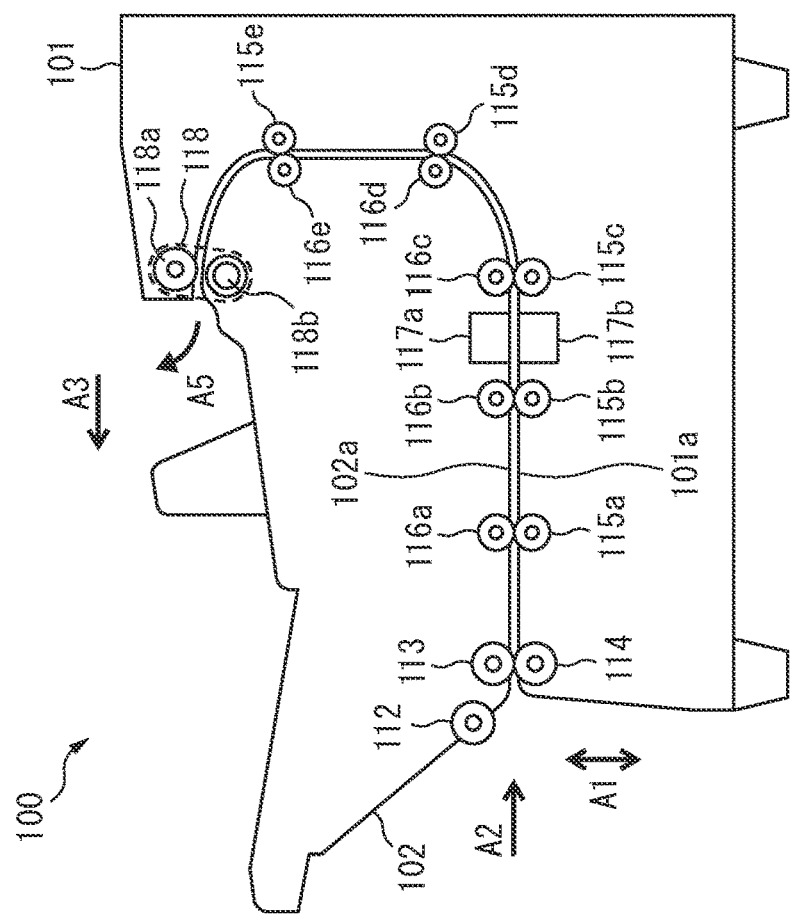

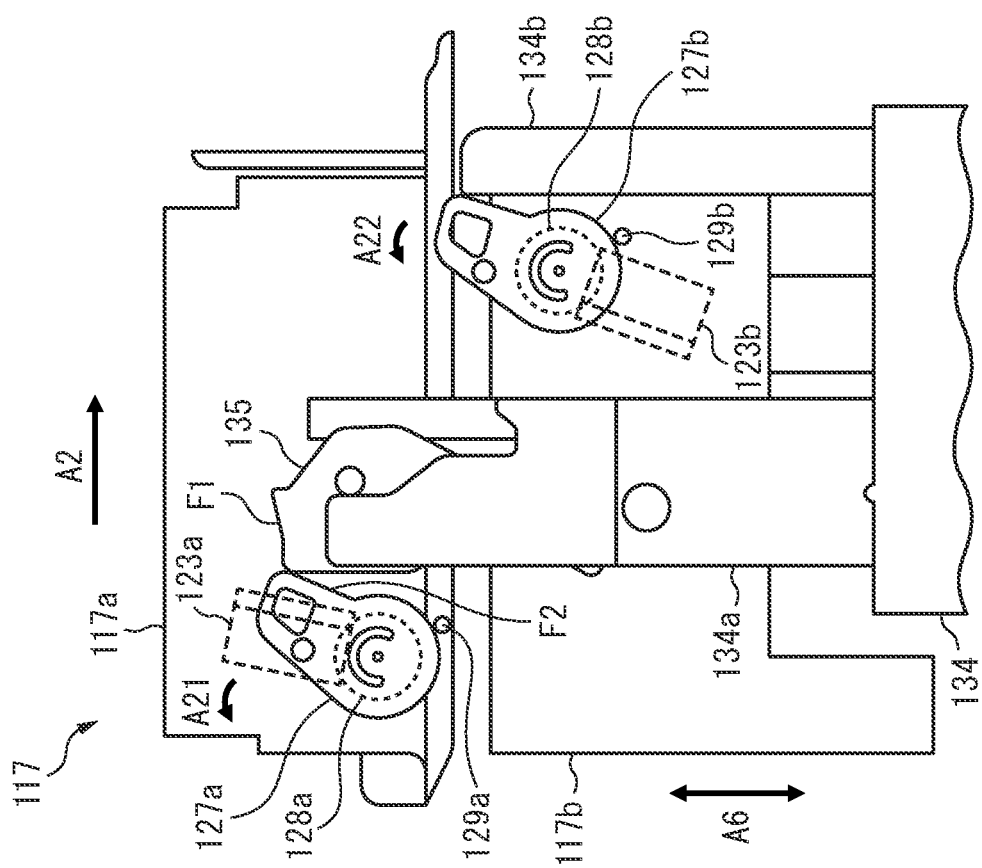
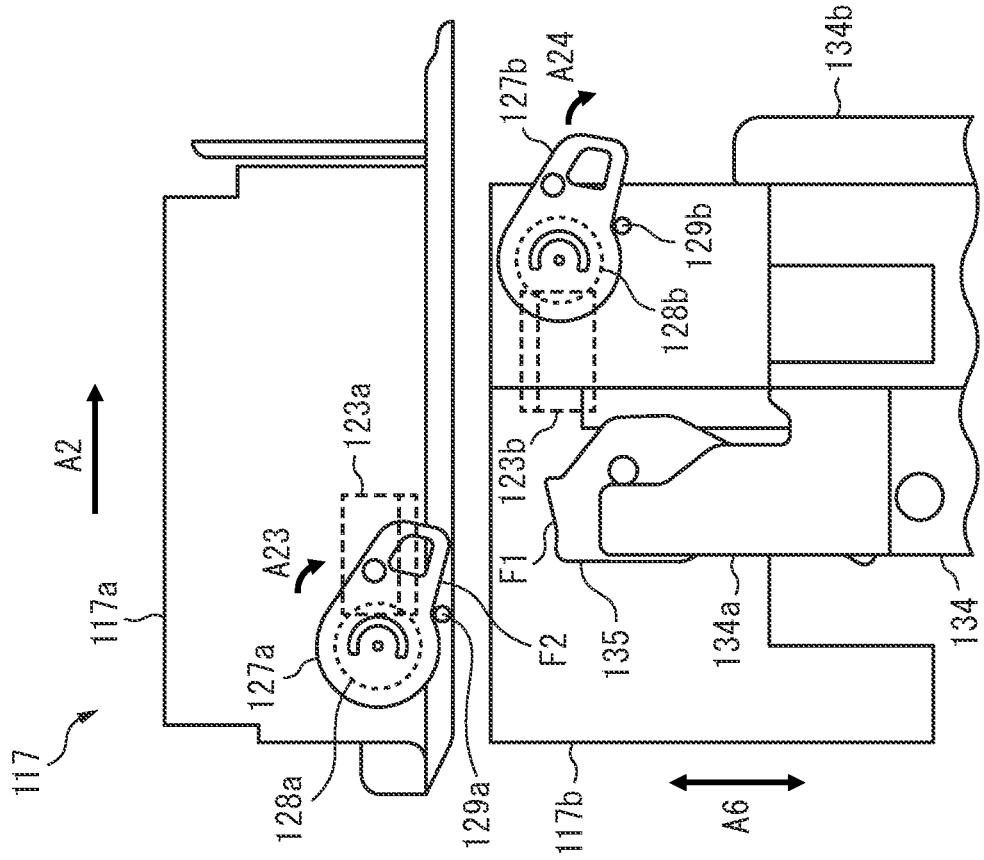

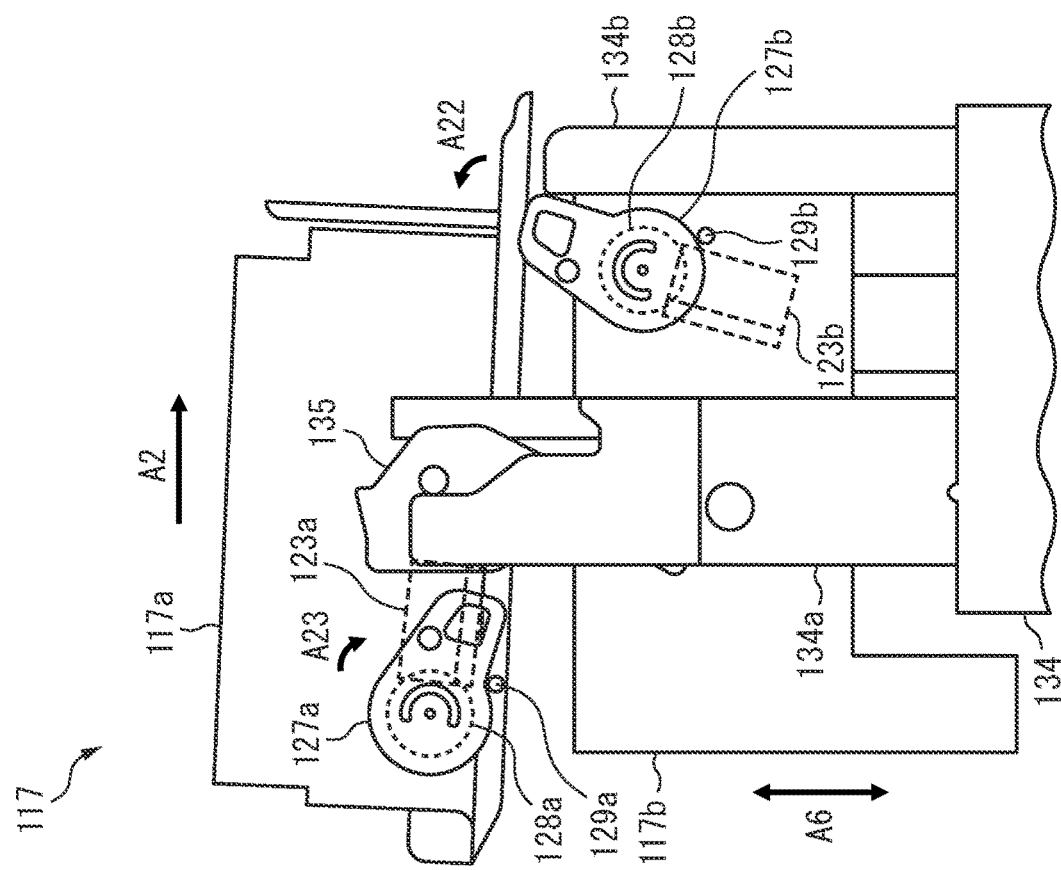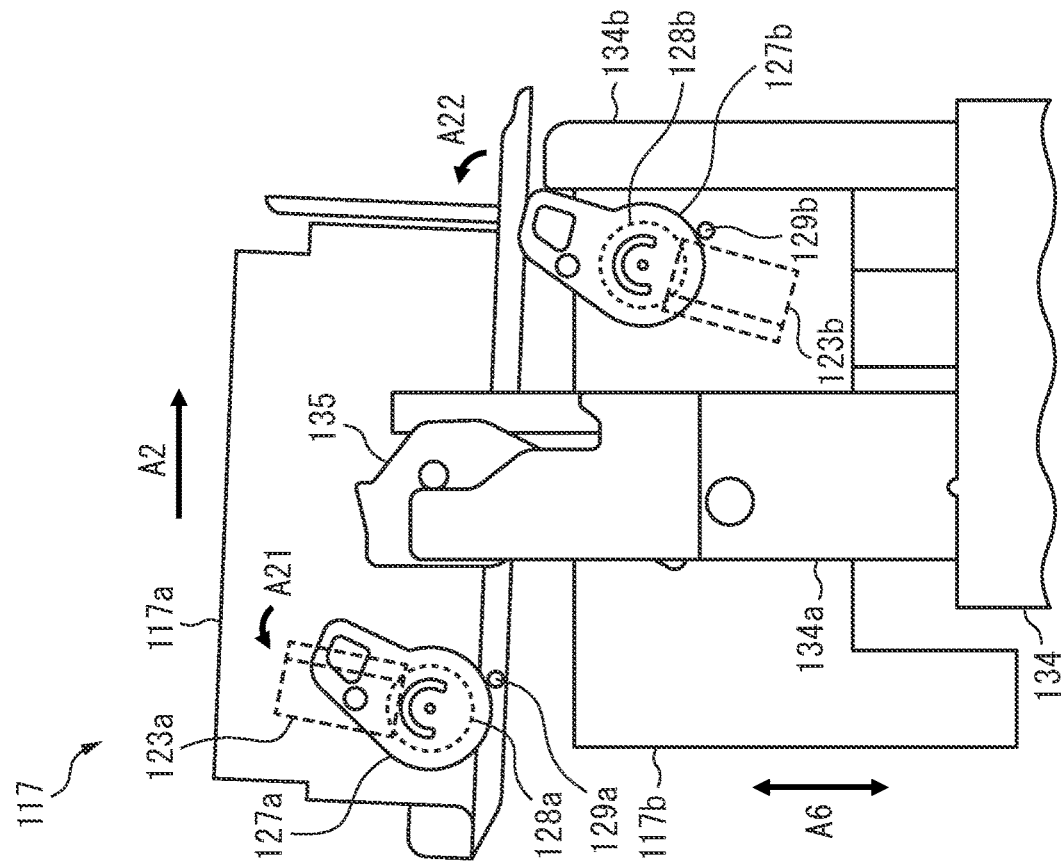

IMAGE READING APPARATUS IN WHICH MEMBER TO MAKE REFERENCE MEMBER MOVE IS PROVIDED TO BE ABLE TO RETRACT

CROSS-REFERENCE TO RELATED APPLICATIONS

This application is based upon and claims the benefit of priority of prior Japanese Patent Application No. 2022-022975, filed on Feb. 17, 2022, the entire contents of which are incorporated herein by reference.

TECHNICAL FIELD

Embodiments described in the present specification relate to an image reading apparatus.

BACKGROUND

In general, a scanner or other image reading apparatus has a backing (reference member) at a position facing an imaging sensor for capturing an image of a medium, and makes the backing move to thereby change the background color of the medium.

An image reading apparatus for making a cam rotate so as to make a backing rotate to a predetermined position and making an abutting part abut against an abutted part to make the cam stop and make the backing stop at a predetermined position even after cutting off of the supply of power to a driving device has previously been disclosed (see Japanese Patent No. 6084272).

SUMMARY

According to some embodiments, an image reading apparatus includes a first housing, a second housing located facing the first housing across a medium conveyance path and provided to be able to be opened and closed with respect to the first housing, an imaging sensor provided at the first housing, a reference member provided at the second housing to be able to move between a first position facing the imaging sensor and a second position separated from the first position, a cam provided at the second housing and connected with the reference member, to make the reference member move from the first position to the second position, and an abutting member provided at the first housing to be able to move in a direction perpendicular to the medium conveyance path, to make the cam move. The abutting member is located at a projecting position sticking out from the first housing, to make the cam move so that the reference member moves from the first position to the second position when the second housing is closed with respect to the first housing. The abutting member is provided so as to be able to retract when the second housing is opened and closed with respect to the first housing and abuts against the cam in the state located at the projecting position.

BRIEF DESCRIPTION OF DRAWINGS

FIG. 3A is a schematic view for explaining a second housing 102.
FIG. 3B is a schematic view for explaining a second housing 102.
FIG. 7A is a schematic view for explaining an operation of a drive mechanism.
FIG. 7B is a schematic view for explaining an operation of a drive mechanism.
FIG. 8A is a schematic view for explaining an operation of a drive mechanism.
FIG. 8B is a schematic view for explaining an operation of a drive mechanism.

DESCRIPTION OF EMBODIMENTS

It is to be understood that both the foregoing general description and the following detailed description are exemplary and explanatory, and are not restrictive of the invention, as claimed.

Hereinafter, an image reading apparatus according to some embodiments will be described with reference to the drawings. However, it should be noted that the technical scope of the invention is not limited to these embodiments, and extends to the inventions described in the claims and their equivalents.

Figure 1:
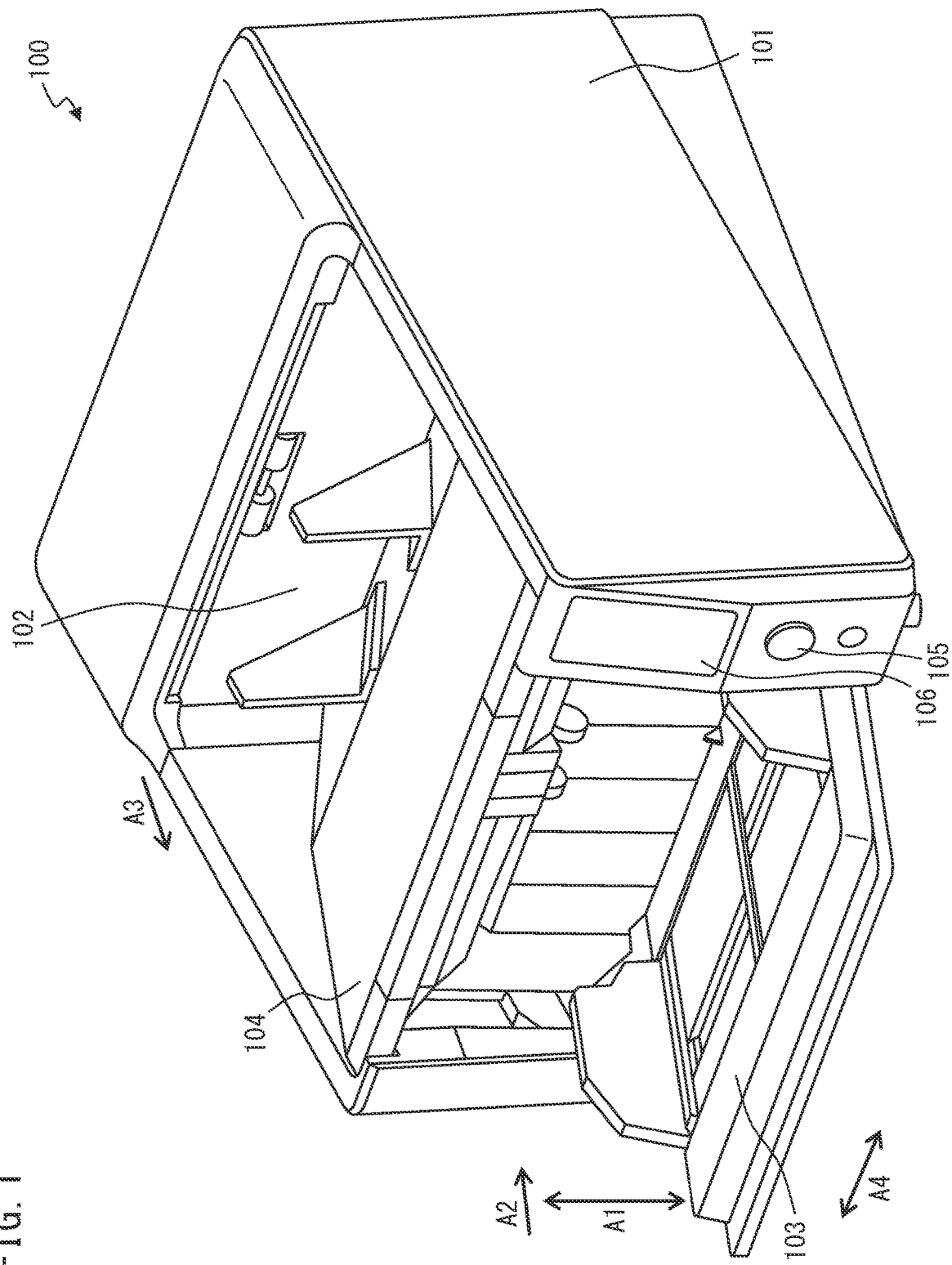
FIG. 1 is a perspective view showing an image reading apparatus 100.

FIG. 1 is a perspective view showing an image reading apparatus 100 configured as an image scanner. The image reading apparatus 100 conveys a medium configured as a document and captures an image of the medium. The medium is printing paper, thick paper, cards, etc. The image reading apparatus 100 may be a facsimile, copier, multifunction peripheral (MFP), etc.

In FIG. 1, an arrow A1 shows an approximately vertical direction (height direction), an arrow A2 shows a medium conveyance direction, an arrow A3 shows a medium ejection direction, and an arrow A4 shows a width direction perpendicular to the medium conveyance direction A2 or a medium ejection direction A3. Below, "upstream" means upstream in the medium conveyance direction A2 or medium ejection direction A3, while "downstream" means downstream in the medium conveyance direction A2 or medium ejection direction A3.

The image reading apparatus 100 is provided with a first housing 101, second housing 102, stacking tray 103, ejection tray 104, operating device 105, display device 106, etc.

The second housing 102 is located at the inside of the first housing 101 and pivotably engages with the first housing 101 by a hinge so as to be able to be opened and closed at the time of medium clogging, the time of cleaning the inside of the image reading apparatus 100, etc.

The stacking tray 103 engages with the first housing 101 to enable stacking of the medium to be conveyed. The stacking tray 103 is provided at the side surface of the first housing 101 at the medium feed side to be able to move in the height direction A1. When the medium is not being conveyed, the stacking tray 103 is located at the position of the bottom end so that the medium is easily stacked and when the medium is being conveyed, the medium stacked at the topmost side rises up to a position contacting a later explained pick roller.

The ejection tray 104 is formed on the second housing 102. The ejection tray 104 stacks the medium ejected from the ejection opening of the first housing 101 and second housing 102.

The operating device 106 has buttons or other input devices and an interface circuit for acquiring signals from the input devices, receives input operations of a user, and outputs operating signals corresponding to the input operations of a user. The display device 107 has a display including liquid crystals, organic EL's (Electro-Luminescence), etc., and an interface circuit for outputting image data to the display, to output the image data to the display. Note that the display device 107 may also be a liquid crystal display with a touch panel function. In this case, the operating device 106 has an interface circuit for acquiring input signals from the touch panel.

Figure 2:
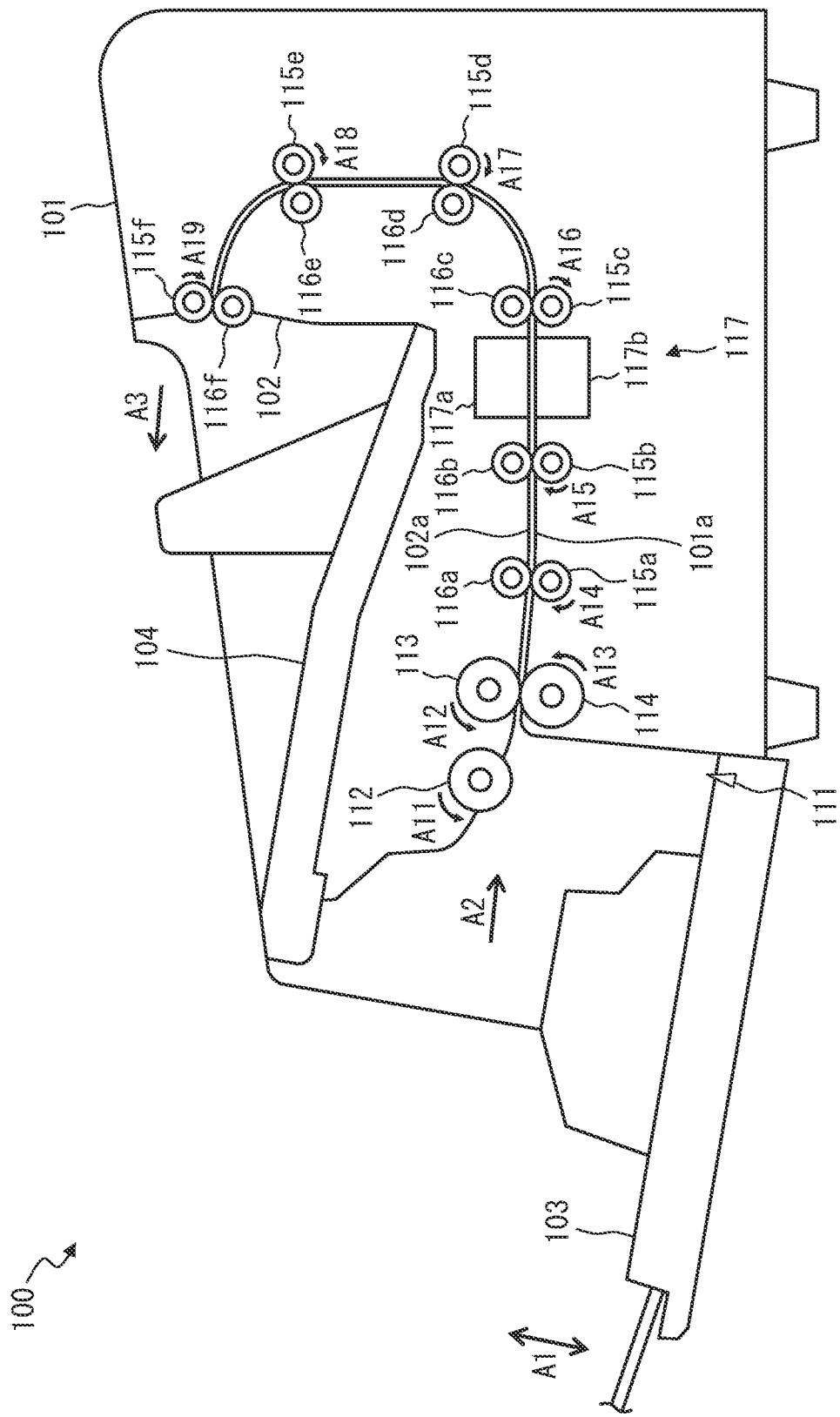
FIG. 2 is a view for explaining a conveyance route of an inside of an image reading apparatus 100.

FIG. 2 is a view for explaining a conveyance route at the inside of the image reading apparatus 100.

The conveyance route at the inside of the image reading apparatus 100 includes a medium sensor 111, pick roller 112, feed roller 113, separation roller 114, first to sixth conveyance rollers 115a to 115f, first to sixth driven rollers 116a to 116f, imaging device 117, etc.

Note that the pick roller 112, feed roller 113, separation roller 114, first to sixth conveyance rollers 115a to 115f, and first to sixth driven rollers 116a to 116f are not limited in number to one each. Multiple ones may also be provided. In this case, the multiple feed rollers 113, separation rollers 114, first to sixth conveyance rollers 115a to 115f, and/or first to sixth driven rollers 116a to 116f are respectively located spaced apart in the width direction A4.

The second housing 102 is located facing the first housing 101 across the medium conveyance path. The surface of the first housing 101 facing the second housing 102 forms a first guide 101a of the medium conveyance path, while the surface of the second housing 102 facing the first housing 101 forms a second guide 102a of the medium conveyance path.

The medium sensor 111 is located at the stacking tray 103, i.e., at the upstream side of the feed roller 113 and separation roller 114, and detects the stacked state of the medium at the stacking tray 103. The medium sensor 111 determines whether the stacking tray 103 has the medium stacked on it by a contact detection sensor through which a predetermined current flows when the medium is in contact with it or the medium is not in contact with it. The medium sensor 111 generates and outputs a medium signal changing in signal value between a state where the stacking tray 103 has the medium stacked on it and a state where it does not have the medium stacked on it. Note that the medium sensor 111 is not limited to a contact detection sensor. As the medium sensor 111, a light detection sensor or any other sensor able to detect the presence of a medium may be used.

The pick roller 112 is provided at the second housing 102 and abuts against the medium stacked at the top most side in the medium on the stacking tray 103 risen to a height substantially equal to the medium conveyance path and then feeds the medium toward the downstream side.

The feed roller 113 is provided inside the second housing 102 at the downstream side of the pick roller 112 and feeds the medium stacked on the stacking tray 103 and fed by the pick roller 112 toward the further downstream side. The separation roller 114 is provided inside the first housing 101 facing the feed roller 113. The separation roller 114 is a so-called "brake roller" or "retard roller" and is provided rotatably in the opposite direction of the medium feed direction or stoppably. The feed roller 113 and separation roller 114 perform a separation operation of the medium and separates and feeds the medium one by one. The feed roller 113 is located at an upper side with respect to the separation roller 114. The image reading apparatus 100 feeds the medium by the so-called top feed system. Note that the feed roller 113 may be located at a lower side with respect to the separation roller 114, and the image reading apparatus 100 may feed the medium by the so-called bottom feed system as well.

The first to sixth conveyance rollers 115a to 115f and first to sixth driven rollers 116a to 116f are provided facing each other at the downstream side of the feed roller 113 and separation roller 114 and convey the medium fed by the feed roller 113 and separation roller 114 toward the downstream side. The sixth conveyance roller 115f and the sixth driven roller 116f eject the medium to the ejection tray 104.

The imaging unit 117 is located at the downstream side of the first to second conveyance rollers 115a to 115b in the medium conveyance direction A2 and captures an image of the medium conveyed by the first to second conveyance rollers 115a to 115b and the first to second driven rollers 116a to 116b. The imaging unit 117 includes a first imaging unit 117a and a second imaging unit 117b located facing each other across the medium conveyance path. The first imaging unit 117a is provided at the second housing 102, while the second imaging unit 117b is provided at the first housing 101.

The medium stacked on the stacking tray 103 is conveyed between the first guide 101a and the second guide 102a toward the medium conveyance direction A2 by the pick roller 112 and feed roller 113 respectively rotating in the medium feed directions A11, A12. The image reading apparatus 100 has, as feed modes, a separation mode for feeding the medium while separating it and a nonseparation mode for feeding the medium without separating it. The feed mode is set by a user using the operating device 106 or an information processing apparatus communicating and connected with medium ejection apparatus 100. If the feed mode is set to the separation mode, the separation roller 114 rotates in the direction of the arrow A13, i.e., the direction opposite to the medium feed direction, or stops. Due to this, feed of the medium other than the separated medium is limited (prevention of double feed). On the other hand, if the feed mode is set to the nonseparation mode, the separation roller 114 rotates in the opposite direction of the arrow A13, i.e., the medium feed direction.

The medium is guided by the first guide 101a and the second guide 102a while the first to the second conveyance rollers 115a to 115b rotate in the direction of the arrows A14 to A15 whereby it is fed to the imaging position of the imaging device 117 and is captured by the imaging device 117. Further, the medium is ejected on the ejection tray 104 by the third to the sixth conveyance rollers 115c to 115f respectively rotating in the directions of the arrows A16 to A19.

FIGS. 3A and 3B are schematic views for explaining the second housing 102. FIG. 3A shows the second housing 102 in the state closed with respect to the first housing 101, while FIG. 3B shows the second housing 102 in the state opened from the first housing 101.

As shown in FIGS. 3A and 3B, the second housing 102 is engaged with the first housing 101 through a hinge 118. One end 118a of the hinge 118 is fastened at the vicinity of the ejection opening of the first housing 101, while the second housing 102 is attached to the hinge 118 to be able to rotate about the shaft 118b provided at the other end of the hinge 118. Due to this, the second housing 102 is provided to be able to rotate in the direction of the arrow A5 about the shaft 118b provided at the vicinity of the ejection opening. In other words, the second housing 102 is provided so as to be able to open and close with respect to the first housing 101. In particular, the second housing 102 is opened and closed with respect to the first housing 101 by moving along the medium conveyance path in the vicinity of the second imaging unit 117b, i.e., in a direction substantially parallel to the medium conveyance path.

As shown in FIG. 3A, the second housing 102 is located facing the first housing 101 in the closed state and forms the medium conveyance path together with the first housing 101. On the other hand, as shown in FIG. 3B, the second housing 102 exposes the medium conveyance path in the open state. Due to this, a user can clean the medium conveyance path and further can remove medium stopped in the medium conveyance path due to jamming, etc.

Figure 4A:
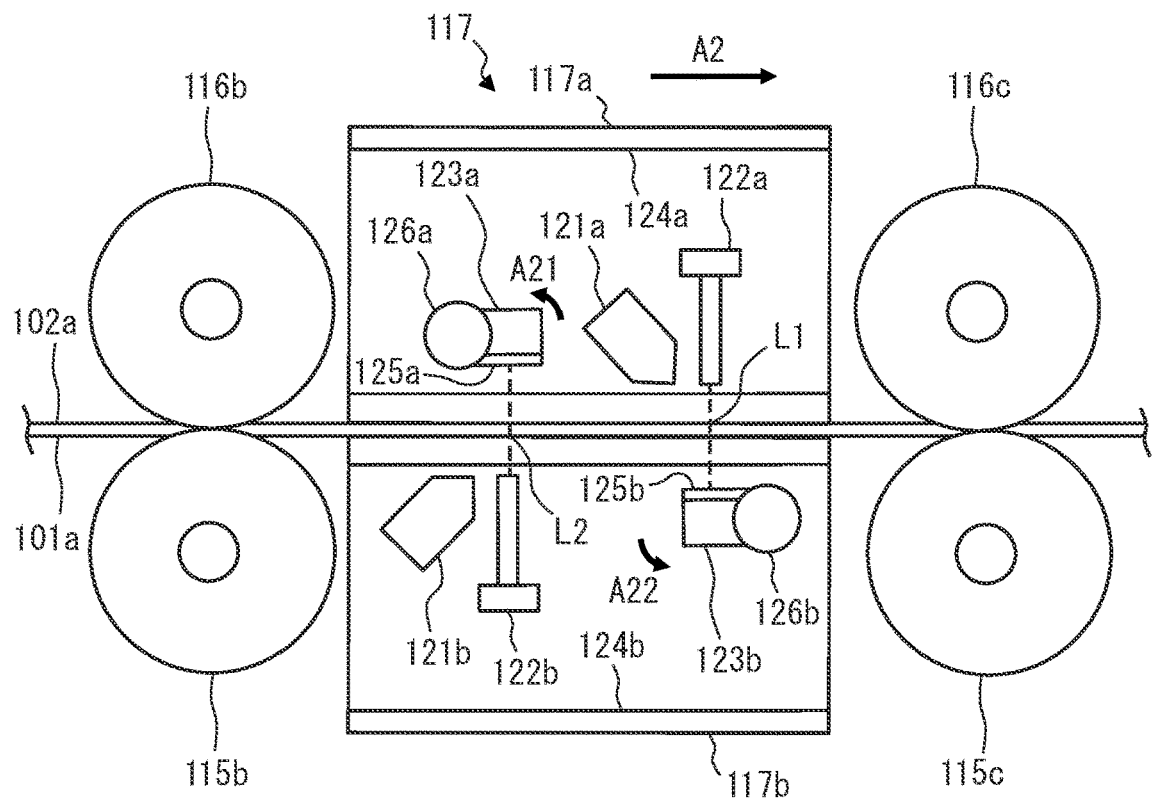
FIG. 4A is a schematic view for explaining an imaging unit 117.
Figure 4B:
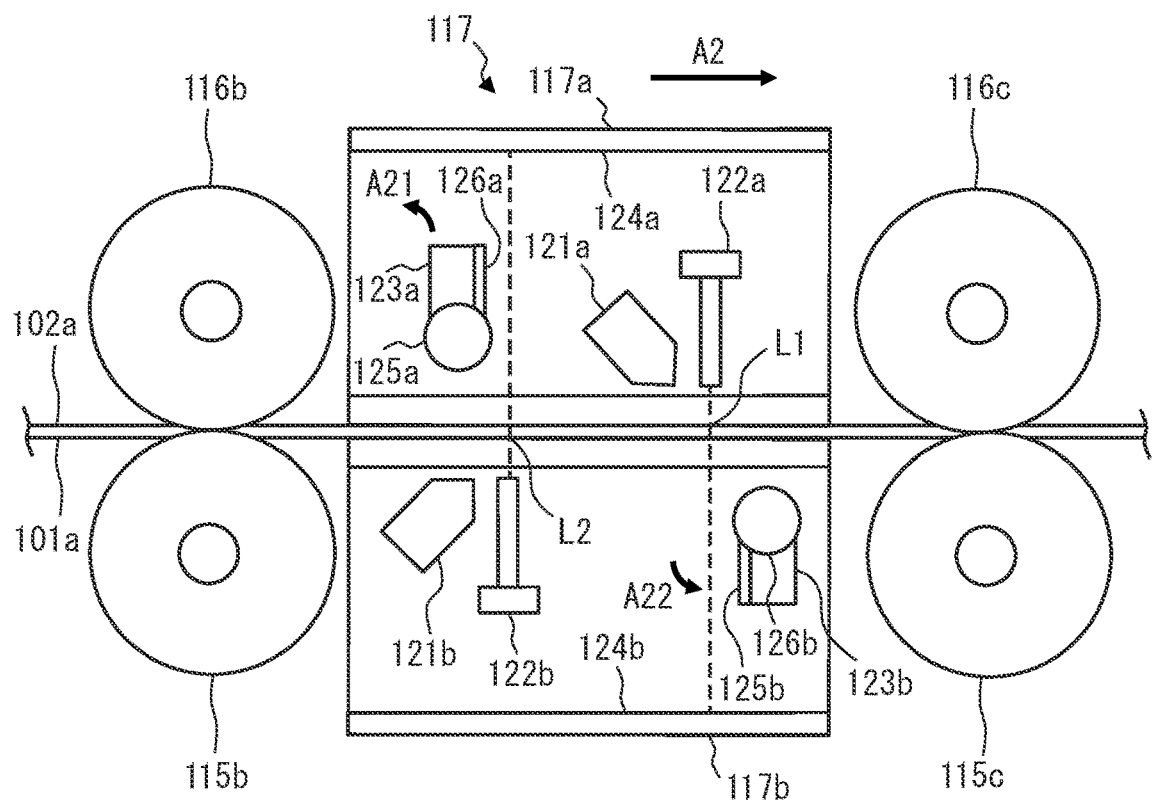
FIG. 4B is a schematic view for explaining an imaging unit 117.

FIGS. 4A and 4B are schematic views for explaining the imaging unit 117.

As shown in FIGS. 4A and 4B, the first imaging unit 117a is provided with a first light source 121a, first imaging sensor 122a, first backing member 123a, first wall member 124a, etc. The second imaging unit 117b is provided with a second light source 121b, second imaging sensor 122b, second backing member 123b, second wall member 124b, etc. The second imaging sensor 122b is one example of the imaging sensor and is provided at the first housing 101. The first backing member 123a is one example of the reference member and is provided at the second housing 102. The first imaging sensor 122a is one example of the second imaging sensor and is provided at the second housing 102. The second backing member 123b is one example of the second reference member and is provided at the first housing 101.

The first light source 121a is provided at the opposite side of the second backing member 123b across the medium conveyance path. The first light source 121a has an LED (light emitting diode). The first light source 121a emits light toward the front surface of the medium conveyed to the position of the imaging unit 117 (if the medium is not being conveyed, the second backing member 123b or the second wall member 124b of the second imaging unit 117b facing it).

Similarly, the second light source 121b is provided at the opposite side of the first backing member 123a across the medium conveyance path. The second light source 121b has an LED. The second light source 121b emits light toward the back surface of the medium conveyed to the position of the imaging unit 117 (if the medium is not being conveyed, the first backing member 123a or the first wall member 124a of the first imaging unit 117a facing it).

The first imaging sensor 122a is provided at the opposite side of the second backing member 123b across the medium conveyance path. The first imaging sensor 122a has a contact optical system type CIS (contact image sensor) line sensor having imaging elements comprised of CMOS's (complementary metal oxide semiconductors) located in a line in the main scan direction. Further, the first imaging sensor 122a has a lens for forming an image on an imaging element and an A/D converter for amplifying the electrical signal output from the imaging element and converting it from an analog to digital (A/D) format. The first imaging sensor 122a captures an image of the front surface of the conveyed medium and the surroundings of the medium at the imaging position L1 to generate an input image and outputs the same. Further, if the medium is not being conveyed, the first imaging sensor 122a captures an image of the second backing member 123b and generates and outputs a reference image.

Similarly, the second imaging sensor 122b is provided at the opposite side of the first backing member 123a across the medium conveyance path. The second imaging sensor 122b has a contact optical system type CIS line sensor having imaging elements comprised of CMOS's located in a line in the main scan direction. The second imaging sensor 122b has a lens for forming an image on an imaging element and an A/D converter for amplifying the electrical signal output from the imaging element and converting it from an analog to digital (A/D) format. The second imaging sensor 122b captures an image of the back surface of the conveyed medium and the surroundings of the medium at the imaging position L2 to generate an input image and outputs the same. Further, if the medium is not being conveyed, the second imaging sensor 122b captures an image of the first backing member 123a and generates and outputs a reference image.

Note that instead of the contact optical system type CIS line sensor provided with imaging elements comprised of CMOS's, a contact optical system type CIS line sensor provided with imaging elements comprised of CCD's (charge coupled devices) may also be utilized. Further, a reduction optical system type line sensor provided with imaging elements comprised of CMOS's or CCD's may also be used. Further, the set of the first light source 121a, first imaging sensor 122a, second backing member 123b, and second wall member 124b may also be omitted.

The first backing member 123a is provided at a position facing the second light source 121b and the second imaging sensor 122b across the medium conveyance path. The first backing member 123a has a first facing surface 125a facing the second imaging sensor 122b. The first facing surface 125a has for example a white color and functions as a white reference member for shading or other correction of the image, based on the image signal of the captured first facing surface 125a. Note that the first facing surface 125a need only have a color other than a black color and may also have a gray or other color rather than a white color.

The first backing member 123a is supported to be able to rotate in the direction of the arrow A21 about the first shaft (rotation axis) 126a. The first backing member 123a is provided to be able to move (rotate) between a facing position where the first facing surface 125a faces the second imaging sensor 122b (position shown in FIG. 4A) and a nonfacing position where the first facing surface 125a separates from the facing position (position shown in FIG. 4B). The facing position of the first backing member 123a is one example of the first position, while the nonfacing position of the first backing member 123a is one example of the second position separated from the facing position.

The second backing member 123b is provided at a position facing the first light source 121a and the first imaging sensor 122a across the medium conveyance path. The second backing member 123b has a second facing surface 125b facing the first imaging sensor 122a. The second facing surface 125b has for example a white color and functions as a white reference member for shading or other correction of the image based on the image signal of the captured second facing surface 125b. Note that the second facing surface 125b need only have a color other than a black color and may also have a gray or other color rather than a white color.

The second backing member 123b is supported to be able to rotate in the direction of the arrow A22 about the second shaft (rotation axis) 126b. The second backing member 123b is provided to be able to move (rotate) between a facing position where the second facing surface 125b faces the first imaging sensor 122a (position shown in FIG. 4A) and a nonfacing position where the second facing surface 125b separates from the facing position (position shown in FIG. 4B). The facing position of the second backing member 123b is one example of the third position, while the nonfacing position of the second backing member 123b is one example of the fourth position separated from the facing position.

The first wall member 124a is provided at a position facing the second imaging sensor 122b when the first backing member 123a is located at the nonfacing position. The surface of the first wall member 124a facing the second imaging sensor 122b has a black color or other color different from the first facing surface 125a.

Similarly, the second wall member 124b is provided at a position facing the first imaging sensor 122a when the second backing member 123b is located at the nonfacing position. The surface of the second wall member 124b facing the first imaging sensor 122a has a black color or other color different from the second facing surface 125b.

Below, the first light source 121a and the second light source 121b will sometimes be referred to all together as the "light sources 121". Further, the first imaging sensor 122a and the second imaging sensor 122b will sometimes be referred to all together as the "imaging sensors 122". Further, the first backing member 123a and the second backing member 123b will sometimes be referred to all together as the "backing members 123". Further, the first wall member 124a and the second wall member 124b will sometimes be referred to all together as the "wall members 124". Further, the first facing surface 125a and the second facing surface 125b will sometimes be referred to all together as the "facing surfaces 125".

As shown in FIG. 4A, if the backing members 123 are located at the facing positions, light emitted from the light sources 121 is reflected by facing surfaces 125 of the backing members 123 at regions where there is no medium present and forms images at the imaging sensors 122. At the images based on the image signals generated at this time, the pixels corresponding to the regions where there is no medium present have a white color. On the other hand, as shown in FIG. 4B, if the backing members 123 are located at the nonfacing position, light emitted from the light sources 121 is reflected by the wall members 124 and forms images at the imaging sensors 122. At the image based on the image signals generated at this time, the pixels corresponding to the regions where there is no medium present have a black color.

Figure 5:
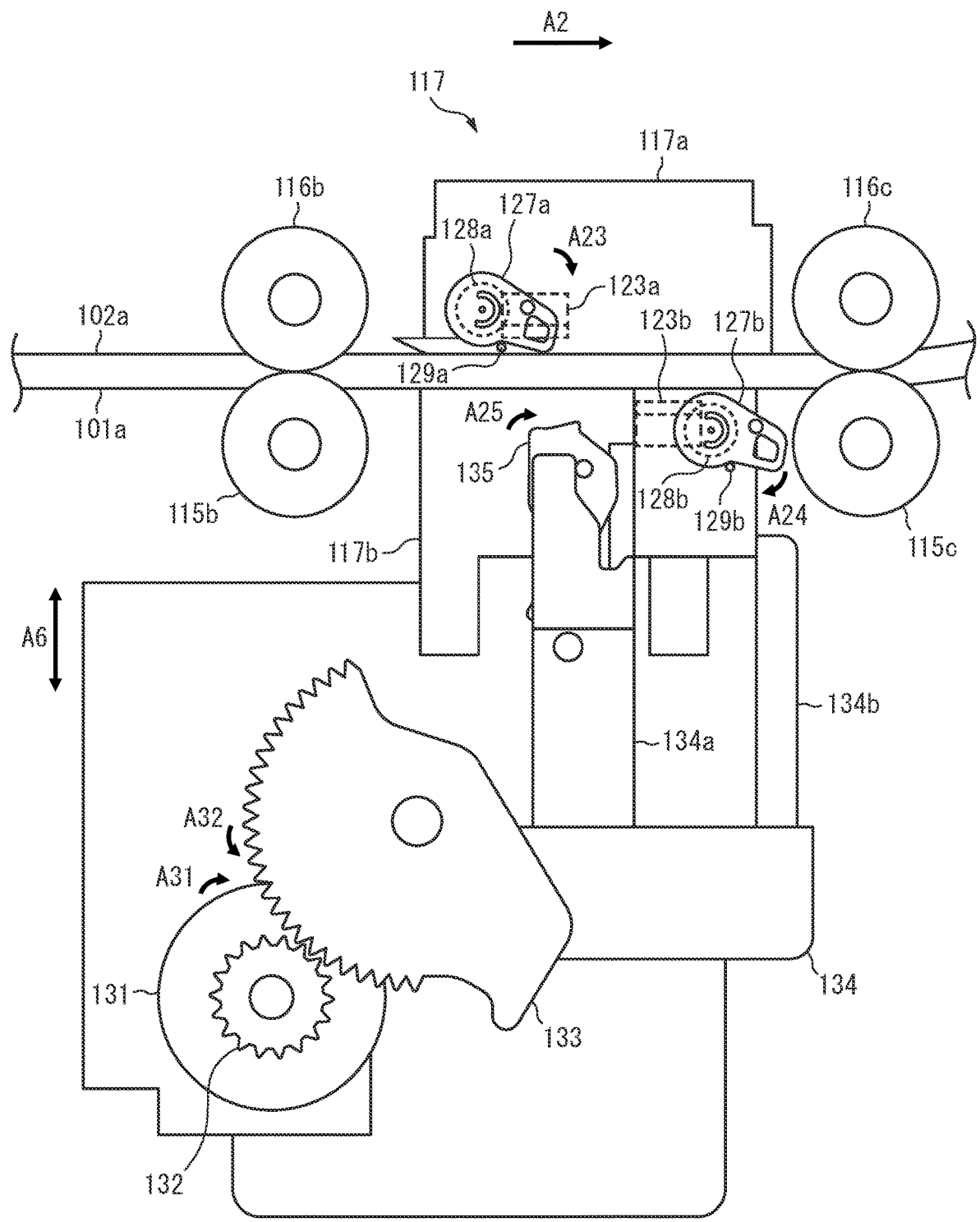
FIG. 5 is a schematic view for explaining a drive mechanism of a backing member 123.

FIG. 5 is a schematic view for explaining a drive mechanism of the backing members 123. FIG. 5 is a schematic view, seen from the side, of the vicinity of the imaging units 117.

As shown in FIG. 5, the image reading apparatus 100 further has a first cam member 127a, second cam member 127b, first elastic member 128a, second elastic member 128b, first stopper 129a, second stopper 129b, first motor 131, gear 132, third cam member 133, slide member 134, and abutting member 135.

The first cam member 127a, first elastic member 128a, and first stopper 129a are provided in the second housing 102 at the end part of the first imaging unit 117a in the width direction A4. On the other hand, the second cam member 127b, second elastic member 128b, and second stopper 129b are provided in the first housing 101 at the end part of the second imaging unit 117b in the width direction A4 (end part at same side as first cam member 127a). The first motor 131, gear 132, third cam member 133, slide member 134, and abutting member 135 are provided at the first housing 101.

The first cam member 127a is an example of the cam and is coupled with the first backing member 123a. The first cam member 127a is provided so as to rotate by the drive force from the first motor 131, and is fastened to the end part of the first shaft 126a of the first backing member 123a in the width direction A4 so that the first backing member 123a rotates along with rotation of the first cam member 127a.

The second cam member 127b is an example of the second cam and is coupled with the second backing member 123b. The second cam member 127b is provided so as to rotate by the drive force from the first motor 131, and is fastened to the end part of the second shaft 126b of the second backing member 123b in the width direction A4 (end part at same size of the first cam member 127a) so that the second backing member 123b rotates along with rotation of the second cam member 127b.

The first elastic member 128a is one example of the elastic member, and is a torsion coil spring etc. and is provided at the first shaft 126a so as to impart a biasing force for rotating the first cam member 127a in the direction of the arrow A23 (opposite direction of arrow A21) to it.

The second elastic member 128b is a torsion coil spring and is provided at the second shaft 126b so as to impart a biasing force for rotating the second cam member in the direction of the arrow A24 (opposite direction of arrow A22) to it.

The first stopper 129a abuts against the first cam member 127a biased by the first elastic member 128a to locate the first cam member 127a at the position shown in FIG. 5.

The second stopper 129b abuts against the second cam member 127b biased by the second elastic member 128b so as to locate the second cam member 127b at the position shown in FIG. 5.

Below, the first cam member 127a and the second cam member 127b will sometimes be referred to all together as the "cam members 127". Further, the first elastic member 128a and the second elastic member 128b will sometimes be referred to all together as the "elastic members 128".

The first motor 131 rotates in accordance with a control signal from the later explained processing circuit and generates a drive force for making the slide member 134 move to rotate the cam members 127 and backing members 123. The first motor 131 generates, as drive force, a first drive force for setting the backing members 123 at the nonfacing position and a second drive force for releasing the backing members 123 from the set nonfacing position.

The gear 132 is provided at the shaft of the first motor 131 and rotates in accordance with the drive force from the first motor 131.

The third cam member 133 has a gear part meshing with the gear 132 and rotates along with rotation of the gear 132. Further, the third cam member 133 is engaged with the slide member 134 and rotates along with rotation of the gear 132 whereby the slide member 134 is made to slide in the up-down direction A6 perpendicular to the medium conveyance path.

The slide member 134 is one example of the slider and is provided to be able to move in the up-down direction A6 perpendicular to the medium conveyance path. The slide member 134 is provided to be able to slide along a not shown rail or other guide part extending along the up-down direction A6, and slides along the rotation of the third cam member 133. Further, the slide member 134 has a first extended part 134a and second extended part 134b extending along the up-down direction A6. At the top end of the first extended part 134a, an abutting member 135 is attached. The first extended part 134a moves in the up-down direction A6 along with the abutting member 135 along with movement of the slide member 134 in the up-down direction A6. The second extended part 134b moves in the up-down direction A6 along with movement of the slide member 134 in the up-down direction A6 and abuts against the second cam member 127b to make the second cam member 127b move (rotate).

The abutting member 135 is provided at an upper end of the first extended part 134a of the slide member 134 to be able to move in the up-down direction A6 perpendicular to the medium conveyance path along with movement of the first extended part 134a. The abutting member 135 is attached to the slide member 134 so as to move in the up-down direction A6 along with movement of the slide member 134 in the up-down direction A6 and abut against the first cam member 127a to make the first cam member 127a move (rotate). Further, the abutting member 135 is supported at the first extended part 134a to be able to swing in the direction of the arrow A25. In other words, the abutting member 135 is provided to be able to move in a direction substantially parallel with the medium conveyance path.

Figure 6:
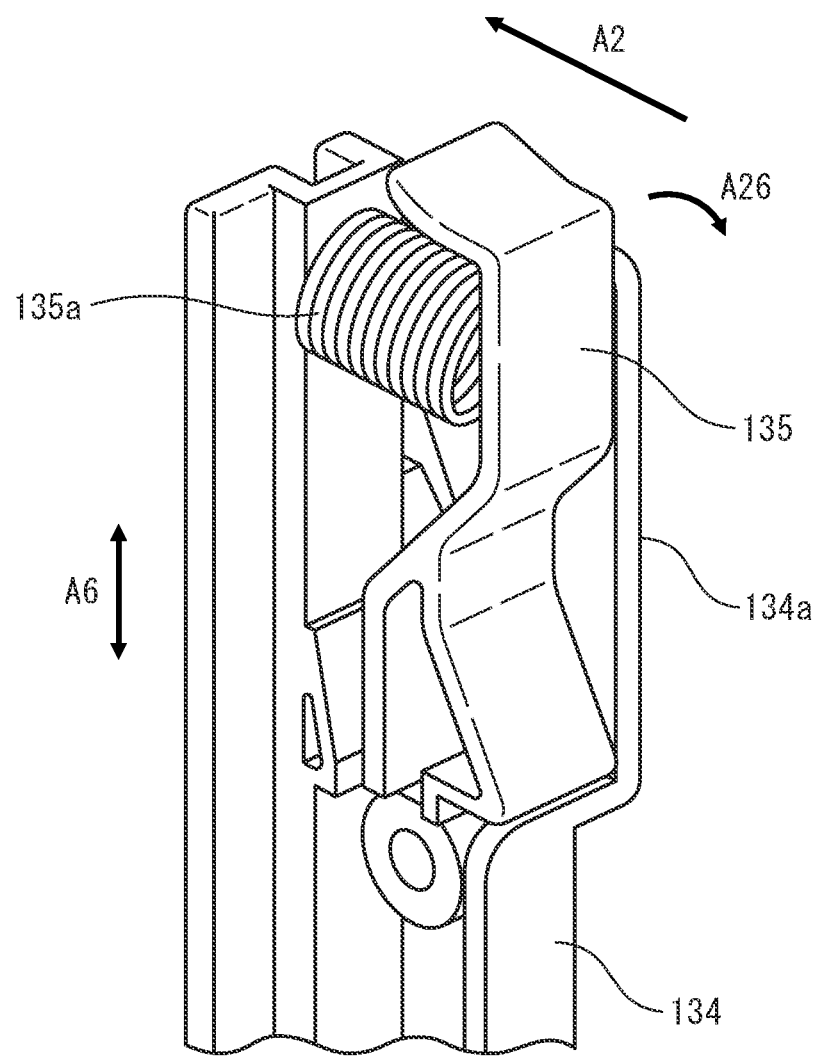
FIG. 6 is a schematic view for explaining an abutting member 135.

FIG. 6 is a schematic view for explaining the abutting member 135. FIG. 6 is a schematic view of the abutting member 135 seen from the opposite side of the side of the abutting member 135 seen in FIG. 5.

As shown in FIG. 6, the image reading apparatus 100 further has a third elastic member 135a. The third elastic member 135a is a compression coil spring or other spring member and is provided at the first extended part 134a of the slide member 134 so as to impart a biasing force in the direction of the arrow A26 (opposite direction of arrow A25) to the abutting member 135. The third elastic member 135a may also be a torsion coil spring or other spring member or rubber member etc.

FIGS. 7A and 7B, FIGS. 8A and 8B, and FIGS. 9A and 9B are schematic views for explaining operation of the drive mechanism of the backing members 123. FIGS. 7A and 7B, FIGS. 8A and 8B, and FIGS. 9A and 9B are schematic views of the vicinity of the imaging units 117 seen from the side.

FIG. 7A shows the state where the second housing 102 is closed with respect to the first housing 101 and the first motor 131 is not generating a drive force. In the state shown in FIG. 7A, the slide member 134 does not rise, and the abutting member 135 and the second extended part 134b respectively do not abut against the first cam member 127a and the second cam member 127b. The first cam member 127a and the second cam member 127b are respectively biased in the directions of the arrows A23 and A24 due to the biasing forces from the first elastic member 128a and the second elastic member 128b, and abut against the first stopper 129a and the second stopper 129b to stop. Due to this, the backing members 123 are located at the facing position.

In this way, the elastic member 128 imparts a biasing force for locating the backing members 123 at the facing position to the cam member 127. The power consumed by the image reading apparatus 100 can be reduced by using the elastic member 128 to locate the backing members 123 at the facing position without driving the first motor 131.

Due to individual differences of parts for transmitting the drive force from the first motor 131 to the first backing member 123a and the second backing member 123b etc., there is a possibility of deviation occurring in the arrangement positions of the first backing member 123a and the second backing member 123b moved by the drive force. Both when locating the backing members 123 at the facing position and nonfacing position, if using drive force from the first motor 131, there is a possibility of the above deviation accumulating each time the positions of the backing members 123 are switched. The image reading apparatus 100 uses the biasing force due to the elastic member 128 when locating the backing members 123 at the facing position. Due to this, the image reading apparatus 100 can reliably locate the backing members 123 at the facing position, and thereby deviation between the arrangement position of the first backing member 123a and the arrangement position of the second backing member 123b can be kept from increasing.

FIG. 7B shows the state where the first motor 131 generates the first drive force from the state shown in FIG. 7A. If the first motor 131 generates the first drive force, the gear 132 and the third cam member 133 respectively rotate in the directions of the arrows A31 and A32 of FIG. 5 and the slide member 134 rises. Due to this, the abutting member 135 and the second extended part 134b respectively abut against the first cam member 127a and the second cam member 127b. The first cam member 127a and the second cam member 127b are respectively pushed up by the abutting member 135 and the second extended part 134b against the biasing forces of the first elastic member 128a and the second elastic member 128b and rotate in the directions of the arrows A21, A22. Due to this, the backing members 123 are located at the nonfacing position.

In this way, the slide member 134 moves due to the drive force from the first motor 131 and makes the second cam member 127b move. The abutting member 135 moves along with movement of the slide member 134 due to the drive force of the first motor 131 and makes the first cam member 127a move. The first cam member 127a and the second cam member 127b are respectively coupled with the first backing member 123a and the second backing member 123b and make the first backing member 123a and the second backing member 123b move from the facing position to the nonfacing position.

The image reading apparatus 100 can link switching of the first backing member 123a and switching of the second backing member 123b by using a single slide member 134 to make both the first backing member 123a and the second backing member 123b move. Further, the image reading apparatus 100 can reduce the number of parts for switching the first backing member 123a and the second backing member 123b and can reduce the cost of the device and weight of the device. Further, the image reading apparatus 100 can reduce the amount of power required for switching the backing member 123 by switching the first backing member 123a and the second backing member 123b by the drive force from a single first motor 131. Further, the image reading apparatus 100 can automatically switch the backing member 123 by computer control by switching the backing members 123 by the drive force from the first motor 131 and can improve the convenience to a user.

Further, the abutting member 135 is provided at the first housing 101 while the first cam member 127a is provided at the second housing 102. For this reason, the abutting member 135 sticks out upward from the first housing 101 and makes the upper surface F1 of the abutting member 135 abut against the lower surface F2 of the first cam member 127a to push up the first cam member 127a. In this way, by being located at a projecting position sticking out from the first housing 101 when the second housing 102 is closed with respect to the first housing 101, the abutting member 135 makes the first cam member 127a move so that the first backing member 123a moves from the facing position to the nonfacing position.

FIG. 8A shows the state where the second housing 102 is opened from the first housing 101 by a user from the state shown in FIG. 7B. In the state shown in FIG. 8A, by being opened from the first housing 101, the second housing 102 moves in a direction substantially parallel with the medium conveyance path (opposite direction of medium conveyance direction A2). Due to this, the first cam member 127a separates from the abutting member 135.

FIG. 8B shows the state right after the state shown in FIG. 8A. In the state shown in FIG. 8B, the first cam member 127a separated from the abutting member 135 is biased in the direction of the arrow A23 by the biasing force of the first elastic member 128a and abuts against the first stopper 129a to stop.

Figure 9A:
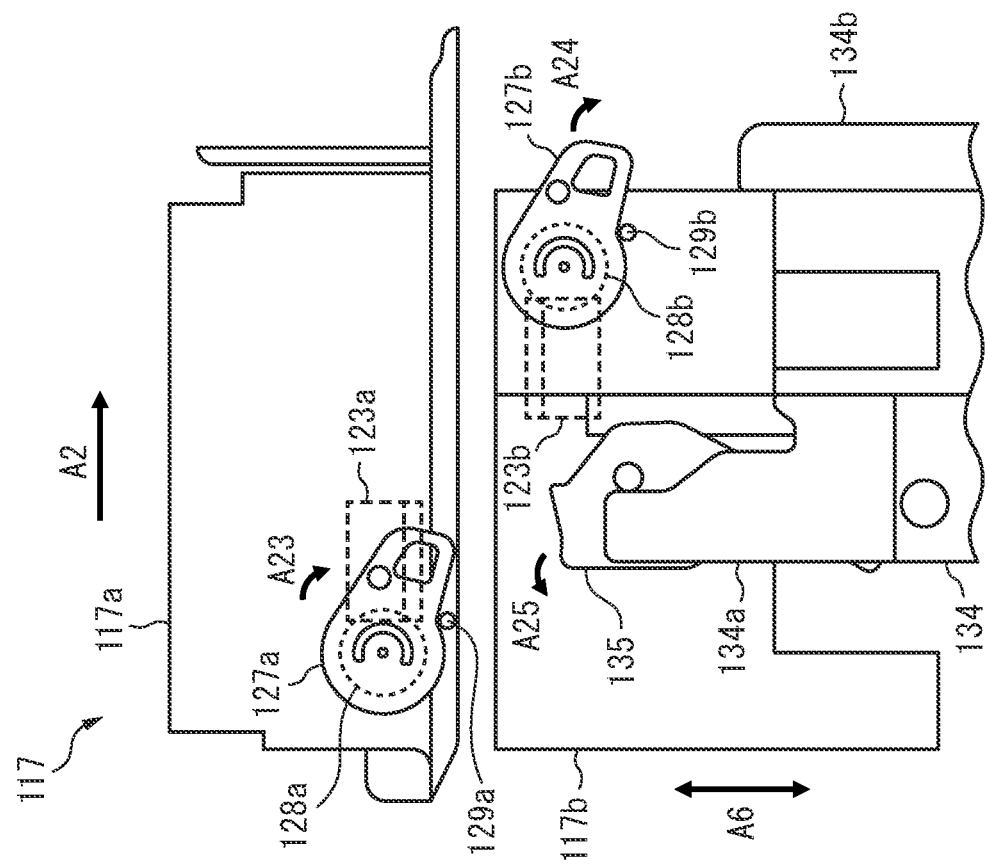
FIG. 9A is a schematic view for explaining an operation of a drive mechanism.

FIG. 9A shows the state where the second housing 102 is closed with respect to the first housing 101 by a user from the state shown in FIG. 8B. In the state shown in FIG. 9A, the second housing 102 moves in a direction substantially parallel with the medium conveyance path (medium conveyance direction A2) by being closed with respect to the first housing 101. Due to this, the first cam member 127a moves toward the abutting member 135 and abuts against the abutting member 135 so that the side surface F4 of the first cam member 127a abuts against the side surface F3 of the abutting member 135. In the above way, the abutting member 135 is provided so as to be able to move in a direction substantially parallel with the medium conveyance path. If the first cam member 127a abuts against the abutting member 135, the abutting member 135 retracts in a direction substantially parallel with the medium conveyance path (medium conveyance direction A2).

In this way, the abutting member 135 is provided so as to be able to retract when the second housing 102 is opened and closed with respect to the first housing 101 and abuts against the first cam member 127a in the state located at the projecting position. Due to this, the image reading apparatus 100 can keep damage from occurring at the abutting member 135 when the second housing 102 is opened or closed by a user in the state wherein it is sticking out from the first housing 101.

Further, the abutting member 135 (slide member 134) slides in the up-down direction A6 perpendicular to the medium conveyance path to make the cam member 127 rotate. In the medium conveyance direction A2 parallel to the medium conveyance path, in the vicinity of the imaging units 117, rollers for conveying the medium, a medium sensor for detecting the position of the medium, an ultrasonic sensor for detecting multi-feed of the medium, and various other parts are located. To make the abutting member 135 (slide member 134) slide in a direction parallel to the medium conveyance path, it is necessary to secure sufficient space in the vicinity of the rollers, medium sensor, ultrasonic sensor, etc. The size of the device therefore has to be increased. The image reading apparatus 100 can keep down the increase of the size of the apparatus while making the backing members 123 suitably move by making the abutting member 135 (slide member 134) slide in the up-down direction A6 perpendicular to the medium conveyance path.

On the other hand, the second housing 102 is opened and closed with respect to the first housing 101 by moving in a direction (direction substantially parallel to medium conveyance path) different from the up-down direction A6 perpendicular to the medium conveyance path, over which the abutting member 135 moves. Due to this, in the image reading apparatus 100 having a U-shaped medium conveyance path (U-turn path), a user can clean the medium conveyance path and, further, can remove medium which has stopped in the medium conveyance path due to jamming etc.

Further, the abutting member 135 is provided to be able to retract by moving in a direction (direction substantially parallel with the medium conveyance path) different from the up-down direction A6 perpendicular with the medium conveyance path for making the first cam member 127a move. Due to this, in the image reading apparatus 100 having a U-shaped medium conveyance path (U-turn path), damage is kept from occurring at the abutting member 135 if the second housing 102 is opened and closed by a user.

Figure 9B:
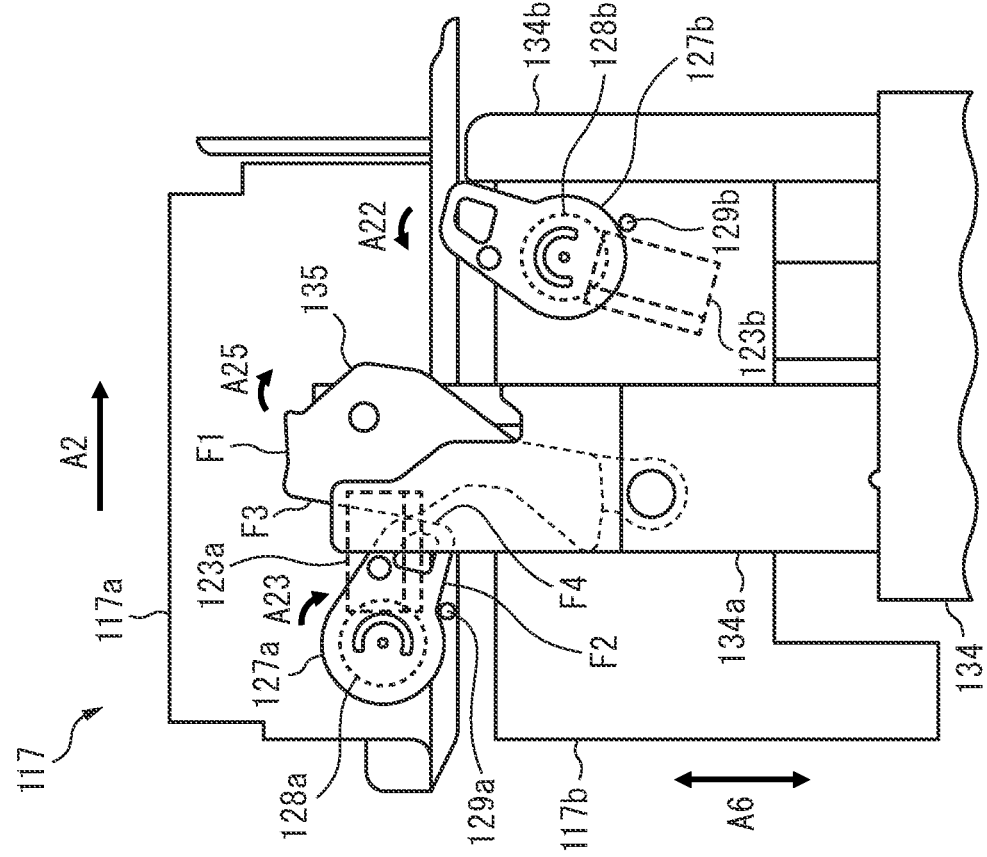
FIG. 9B is a schematic view for explaining an operation of a drive mechanism.

FIG. 9B shows the imaging units 117 in the state where the first motor 131 generates the second drive force from the state shown in FIG. 9A. If the first motor 131 generates the second drive force, the gear 132 and the third cam member 133 respectively rotate in the opposite directions of the arrows A31 and A32 of FIG. 5 and the slide member 134 descends. Due to this, the abutting member 135 and the second extended part 134b respectively separate from the first cam member 127a and the second cam member 127b. The first cam member 127a and the second cam member 127b are respectively biased in the directions of the arrows A23 and A24 by the bias force from the first elastic member 128a and the second elastic member 128b and abut against the first stopper 129a and the second stopper 129b, to stop. Due to this, the backing members 123 are located at the facing position.

Figure 10:
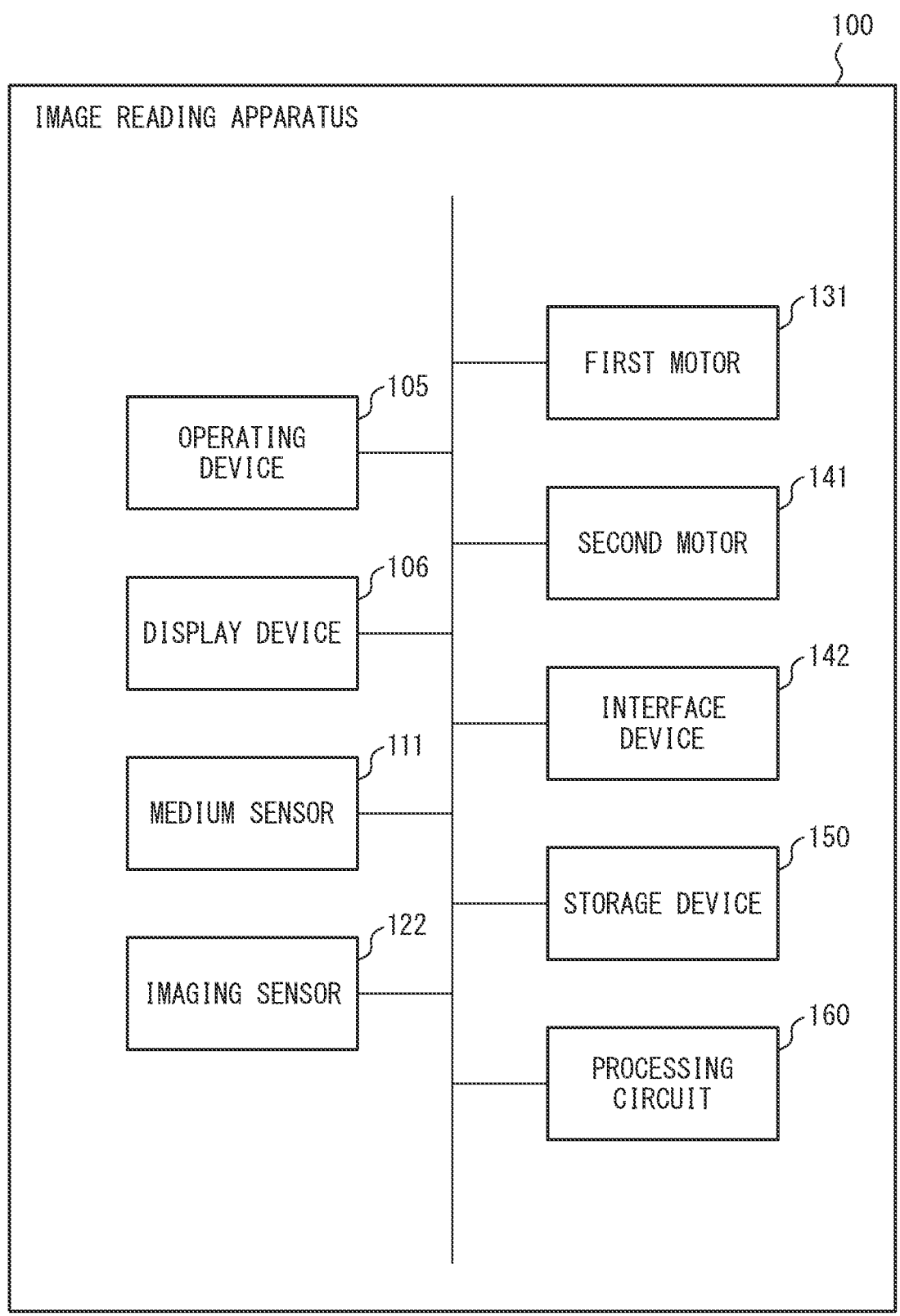
FIG. 10 is a block diagram showing the schematic constitution of an image reading apparatus 100.

FIG. 10 is a block diagram showing the schematic constitution of the image reading apparatus 100.

The image reading apparatus 100 further has, in addition to the above-mentioned constitution, a second motor 141, interface device 142, storage device 150, processing circuit 160, etc.

The second motor 141 includes one or more motors. The second motor 141 makes the pick roller 112, feed roller 113, separation roller 114, and first to sixth conveyance rollers 115a to 115f rotate to convey the medium by control signals from the processing circuit 160. Note that the first to sixth driven rollers 116a to 116f may also be provided not to be driven by the first to sixth conveyance rollers 115a to 115f but to rotate by way of the drive force of the second motor 141.

The interface device 142 has an interface circuit based on for example a USB or other serial bus and is electrically connected with a not shown information processing apparatus (for example, a personal computer, mobile information terminal, etc.) to transmit and receive input images and various information. Further, instead of the interface device 142, a communication device having an antenna transmitting and receiving wireless signals and a wireless communication interface circuit for transmitting and receiving signals through a wireless communication line in accordance with a predetermined communication protocol may be used. The predetermined communication protocol is, for example, a wireless LAN (local area network). The communication device may also have a wired communication interface circuit for transmitting and receiving signals through a wire communication line in accordance with a wired LAN or other communication protocol.

The storage device 140 has a RAM (random access memory), ROM (read only memory), or other memory device, hard disk or other fixed disk device, flexible disk, optical disk, or other portable storage device, etc. Further, the storage device 140 stores computer programs, databases, tables, etc. used for various processing of the medium ejection apparatus 100. The computer programs may be installed on the storage device 140 from a computer-readable, non-transitory medium such as a CD-ROM (compact disc read only memory), DVD-ROM (digital versatile disc read only memory), etc., by using a well-known setup program etc.

The processing circuit 150 operates based on a program stored in advance in the storage device 140. The processing circuit is for example a CPU (central processing unit). As the processing circuit 150, a DSP (digital signal processor), LSI (large scale integrated circuit), ASIC (application specific integrated circuit), FPGA (field-programmable gate array), etc. may be used.

The processing circuit 160 is connected to the operating device 105, display device 106, medium sensor 111, imaging sensors 122, first motor 131, second motor 141, interface device 142, storage device 150, etc. and controls these parts. The processing circuit 1650 performs control for driving the first motor 131 and second motor 141, control for imaging of the imaging sensors 122, etc., based on the signal received from the medium sensor 111. The processing circuit 160 acquires input images from the imaging sensors 122 and sends them through the interface device 142 to the information processing apparatus. Further, the processing circuit 160 controls the first motor 131 and locates the backing members 123 at the facing position or nonfacing position.

Figure 11:
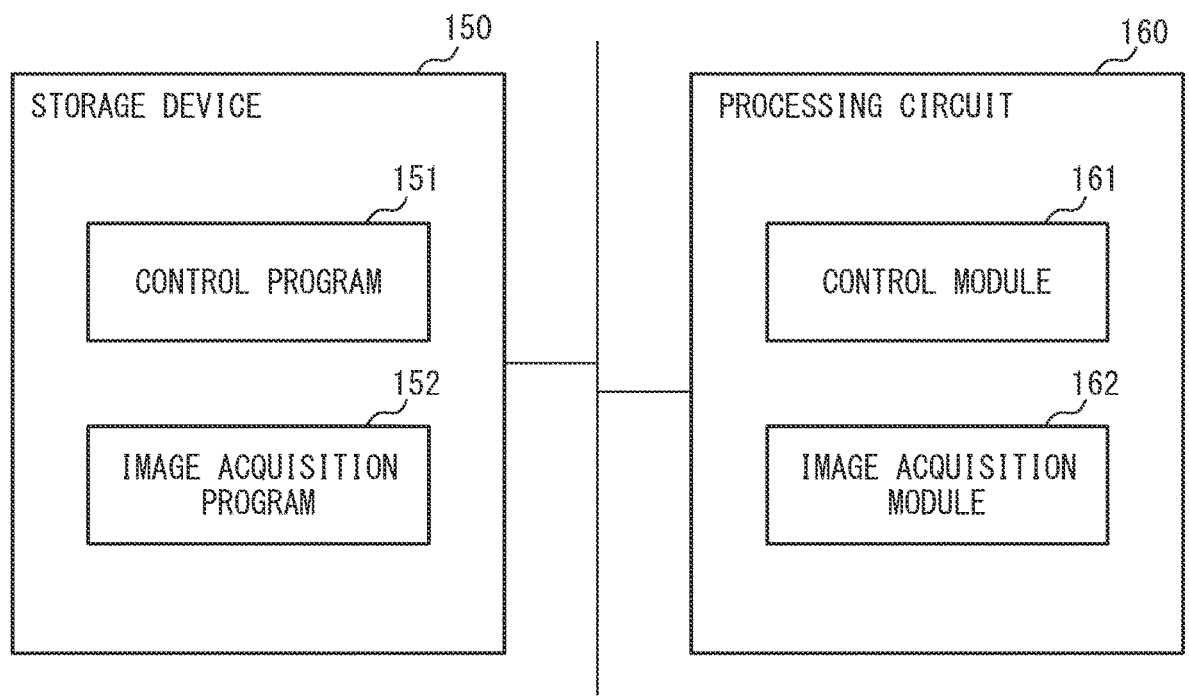
FIG. 11 is a view showing the schematic constitution of a storage device 150 and processing circuit 160.

FIG. 11 is a view showing the schematic constitution of the storage device 150 and processing circuit 160.

As shown in FIG. 11, the storage device 150 stores a control program 151, image acquisition program 152, etc. These programs are function modules loaded by software operating on a processor. The processing circuit 160 reads the programs stored in the storage device 150 and operates in accordance with the read programs. Due to this, the processing circuit 160 functions as a control module 161 and image acquisition module 162.

Figure 12:
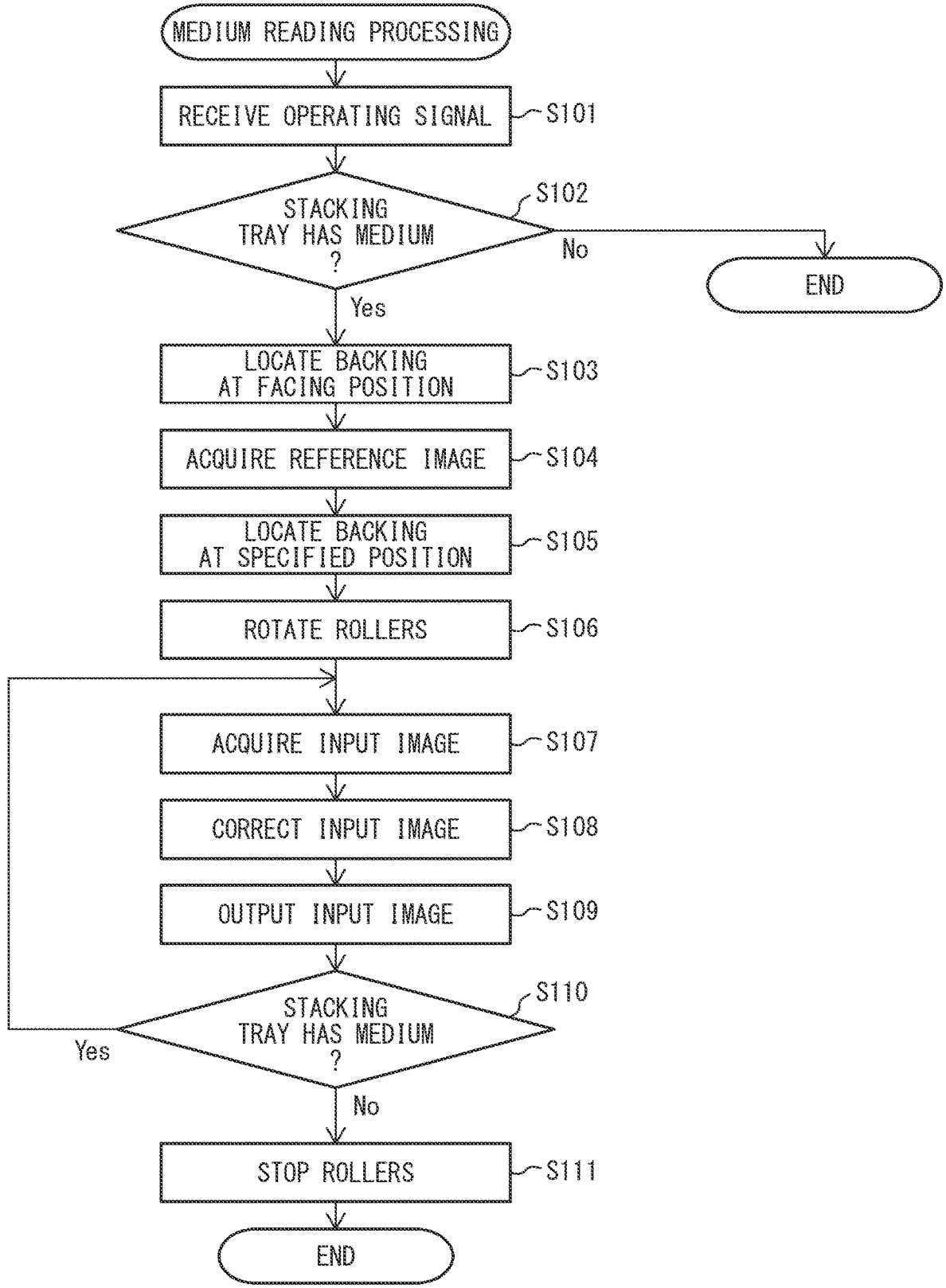
FIG. 12 is a flow chart for showing an example of an operation of medium reading processing.

FIG. 12 is a flow chart showing an example of operation of the medium reading processing of the image reading apparatus 100.

Below, referring to the flow chart shown in FIG. 12, an example of operation of the medium reading processing of the image reading apparatus 100 will be explained. Note that the flow of operation explained below is performed mainly by the processing circuit 160 in cooperation with the elements of the image reading apparatus 100, based on programs stored in the storage device 150 in advance.

First, the control module 161 stands by until receiving an instruction for reading a medium from a user using the operating device 105 or information processing apparatus and receiving an operating signal instructing reading of the medium from the operating device 105 or interface device 142 (step S101).

Next, the control module 161 acquires a medium signal from the medium sensor 111 and determines whether the stacking tray 103 has the medium stacked on it, based on the acquired medium signal (step S102). If the stacking tray 103 does not have the medium stacked on it, the control module 161 ends the series of steps.

On the other hand, if the medium is stacked on the stacking tray 103, the control module 161 controls the first motor 131 to locate the backing members 123 at the facing position (step S103).

Next, the image acquisition module 162 makes the imaging sensors 122 capture images of the backing members 123 to acquire reference images from the imaging sensors 122 (step S104).

Next, the control module 161 controls the first motor 131 to locate the backing members 123 at designated positions designated by a user among the facing position and nonfacing position (step S105). The designated positions are designated by a user using the operating device 105 or information processing apparatus before the medium reading processing is performed and is set in advance in the storage device 150. By locating the backing members 123 at the facing position, the image reading apparatus 100 can make the background of the input image a white color and an image with a background which does not stand out can be acquired. On the other hand, by locating the backing members 123 at the nonfacing position, the image reading apparatus 100 can make the background of the input image a black color and a medium having a white color can be more accurately cropped from the input image.

Next, the control module 161 controls the second motor 141 so as to make the pick roller 112, feed roller 113, separation roller 114, first to sixth conveyance rollers 115a to 115f, and/or first to sixth driven rollers 116a to 116f rotate and convey the medium (step S106).

Next, the image acquisition module 162 makes the imaging sensors 122 capture images of the medium to acquire an input images from the imaging sensors 122 (step S107).

Next, the image acquisition module 162 uses the reference images acquired at step S104 to correct the acquired input images (step S108). The image acquisition module 162 utilizes known image processing technology and uses the reference images to correct the shading of the input images.

Next, the image acquisition module 162 transmits the corrected input images through the interface device 142 to the information processing apparatus to output them (step S109).

Next, the control module 161 determines whether the stacking tray 103 has the medium remaining on it based on the medium signal received from the medium sensor 111 (step S110). If the stacking tray 103 has the medium remaining on it, the control module 161 returns the processing to step S107 and repeats the processing of steps S107 to S110.

On the other hand, if the stacking tray 103 has no medium remaining at it, the control module 161 controls the second motor 141 so as to make the rollers stop (step S111) and ends the series of steps.

Note that the processing of steps S103, S104, and S108 may also be omitted.

As explained in detail above, at the image reading apparatus 100, to rotate the first cam member 127a for rotating the first backing member 123a located at the second housing 102, the abutting member 135 is located to stick out from the first housing 101. The abutting member 135 is provided so as to be able to swing to thereby retract if the first cam member 127a is abutted against when closing the second housing 102. Due to this, the image reading apparatus 100 can keep damage from occurring at the abutting member 135 for making the first backing member 123a move.

Figure 13A:
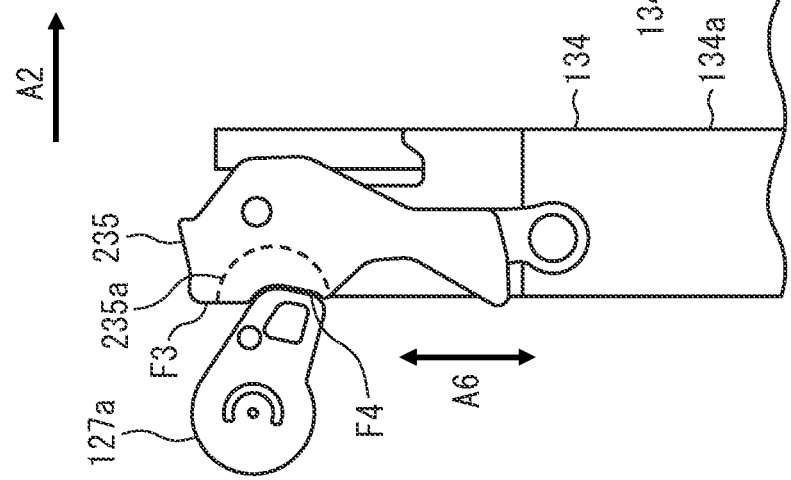
FIG. 13A is a schematic view for explaining another abutting member 235.
Figure 13B:
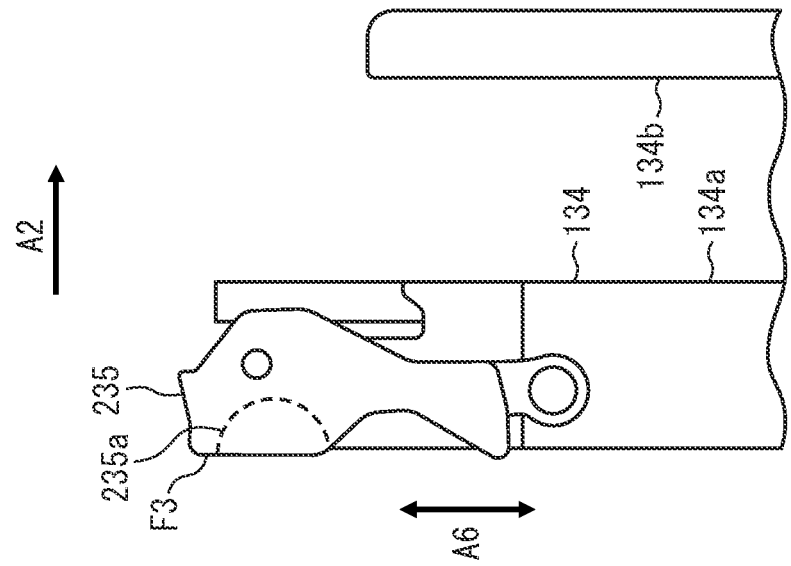
FIG. 13B is a schematic view for explaining another abutting member 235.

FIGS. 13A and 13B are schematic views for explaining an abutting member 235 of an image reading apparatus according to another embodiment. FIG. 13A is a schematic view showing the abutting member 235 in the state where the first cam member 127a is not abutting against it, while FIG. 13B is a schematic view showing the abutting member 235 in the state where the first cam member 127a is abutting against it.

The abutting member 235 is used instead of the abutting member 135 of the image reading apparatus 100. The abutting member 235 has a structure and function similar to the abutting member 135. However, the abutting member 235 is not attached to the first extended part 134a of the slide member 134 to be able to swing, but is attached fixed to it. Further, in the abutting member 235, the side surface F3 which the side surface F4 of the first cam member 127a abuts against is provided with a fourth elastic member 235a. The fourth elastic member 235a is formed by a rubber member etc. When the first cam member 127a moves toward the abutting member 235 and strikes the abutting member 235 so that the side surface F4 of the first cam member 127a abuts against the side surface F3 of the abutting member 235, the abutting member 235 is squeezed in a direction (medium conveyance direction A2) substantially parallel to the medium conveyance path.

In this way, the abutting member 235 is provided so as to be able to retract if the second housing 102 is opened and closed with respect to the first housing 101 in the state of being located at the projecting position and abuts against the first cam member 127a. Due to this, the image reading apparatus can keep damage from occurring at the abutting member 135 if the second housing 102 is opened and closed by a user in the state where the abutting member 235 projects out from the first housing 101.

Further, the abutting member 235 is provided to be able to retract by movement in a direction (direction substantially parallel with medium conveyance path) different from the up-down direction A6 perpendicular with the medium conveyance path for making the first cam member 127a move. Due to this, in an image reading apparatus having a U-shaped medium conveyance path (U-turn path), damage is kept from occurring at the abutting member 235 if the second housing 102 is opened and closed by a user.

As explained in detail above, the image reading apparatus can keep damage from occurring at the abutting member 235 for making the first backing member 123a move, even if the abutting member 235 is provided with the fourth elastic member 235a.

Figure 14:
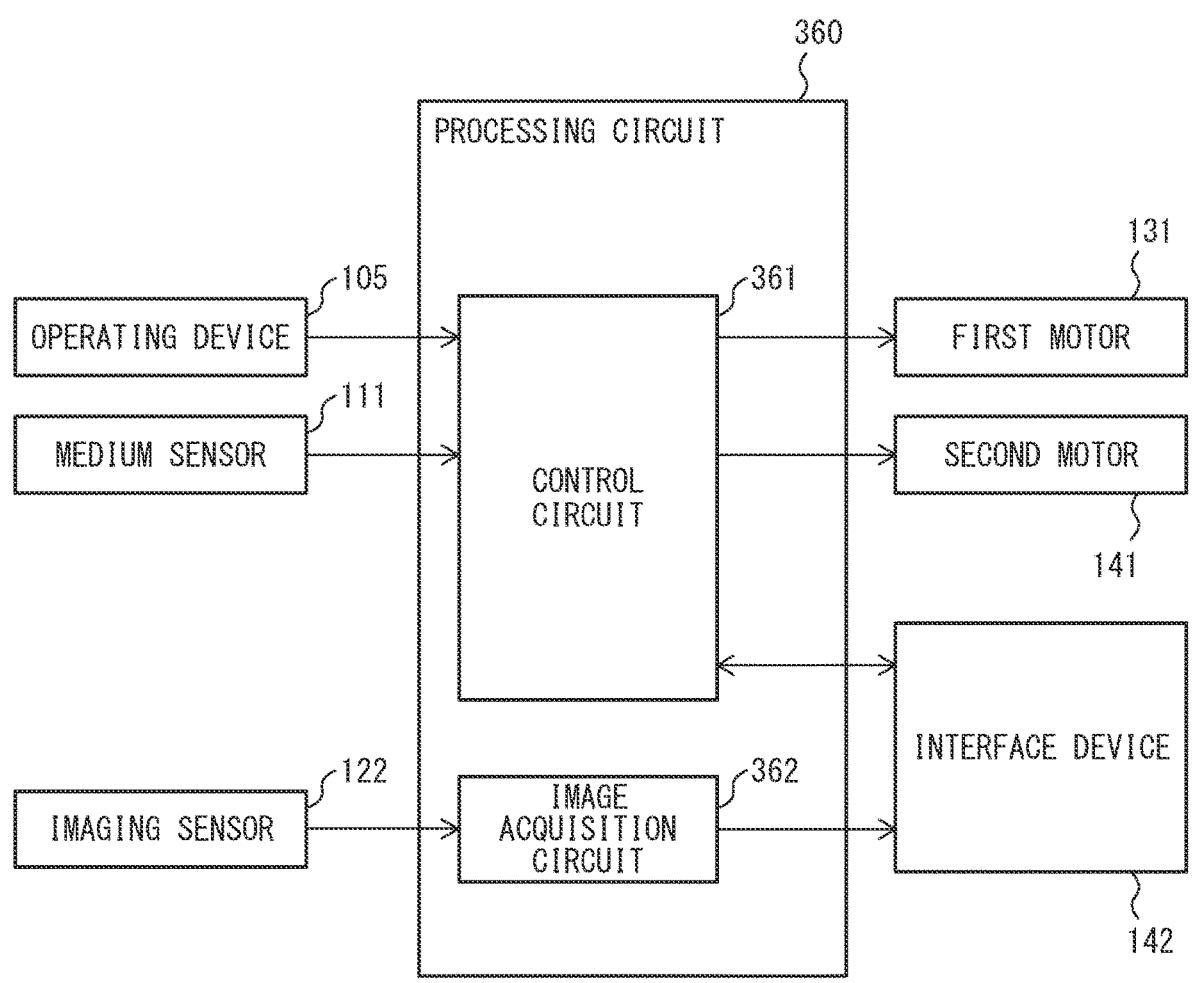
FIG. 14 is a view showing the schematic constitution of a processing circuit 360 according to another embodiment.

FIG. 14 is a view showing the schematic constitution of a processing circuit 360 of an image reading apparatus according to another embodiment.

The processing circuit 360 is used in place of the processing circuit 160 of the image reading apparatus 100 and performs medium reading processing etc., in place of the processing circuit 160. The processing circuit 360 has a control circuit 361, image acquisition circuit 362, etc. Note that these parts may also be configured by respectively independent integrated circuits, microprocessors, firmware, etc.

The control circuit 361 is one example of the control module and has a function similar to the control module 161. The control circuit 361 receives an operating signal from the operating device 105 or interface device 142 and a medium signal from the medium sensor 111 and controls the first motor 131 and the second motor 141, based on the various received information.

The image acquisition circuit 362 is one example of the image acquisition module and has a function similar to the image acquisition module 162. The image acquisition circuit 362 acquires reference images and input images from the imaging sensors 122, uses the reference images to correct the input images, and outputs them to the interface device 142.

As explained in detail above, the image reading apparatus can keep damage from occurring at the abutting member for making the first backing member 123a move, even when using the processing circuit 360.

Above, preferred embodiments were explained, but the embodiments are not limited to these. For example, the backing members 123 are provided so as to be located at the nonfacing position by biasing force by the elastic members 128 if the first motor 131 has not generated the first drive force and located at the facing position if the first motor 131 has generated the first drive force.

Further, the backing members 123 need not be provided to be able to rotate and may also be provided to be able to slide along the medium conveyance direction A2. In this case, for example, the backing members 123 are located at the facing position by biasing force by the elastic members, are pressed along the medium conveyance direction A2 along with rotation of the cam members 127, and are provided so as to be able to slide to the nonfacing position.

Further, the image reading apparatus may be any apparatus so long as having a housing which can be opened and closed. For example, it may be a so-called flatbed type of scanner capturing an image of a medium without conveying it.

In an image reading apparatus, if a member for making a reference member move is provided sticking out from a housing, when opening and closing the housing, there is a possibility of the housing striking and damaging the member for making the reference member move.

The medium ejection apparatus according to the embodiments can keep damage from occurring at a member for making a reference member move.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations can be made hereto without departing from the spirit and scope of the invention.

What is claimed is:

1. An image reading apparatus comprising:
   a first housing;
   a second housing located facing the first housing across a medium conveyance path and provided to be able to be opened and closed with respect to the first housing;

an imaging sensor provided at the first housing;

a reference member provided at the second housing to be able to move between a first position facing the imaging sensor and a second position separated from the first position;

a cam provided at the second housing and connected with the reference member, to make the reference member move from the first position to the second position; and an abutting member provided at the first housing to be able to move in a direction perpendicular to the medium conveyance path, to make the cam move, wherein the abutting member is located at a projecting position sticking out from the first housing, to make the cam move so that the reference member moves from the first position to the second position when the second housing is closed with respect to the first housing, and wherein the abutting member is provided so as to be able to retract when the second housing is opened and closed with respect to the first housing and abuts against the cam in the state located at the projecting position.

2. The image reading apparatus according to claim 1, further comprising an elastic member to impart a biasing force for locating the reference member at the first position to the cam.

3. The image reading apparatus according to claim 1, further comprising a motor to generate a drive force, wherein the abutting member moves by the drive force from the motor.

4. The image reading apparatus according to claim 1, further comprising a second imaging sensor provided at the second housing, a second reference member provided at the first housing to be able to move between a third position facing the second imaging sensor and a fourth position separated from the third position, a second cam provided at the first housing and connected with the second reference member, to make the second reference member move from the third position to the fourth position, and a slider provided at the first housing to be able to move in a direction perpendicular to the medium conveyance path, to make the second cam move, wherein the abutting member is attached to the slider so as to move along with movement of the slider and make the cam move.

5. The image reading apparatus according to claim 1, wherein the second housing is opened and closed with respect to the first housing by moving in a direction different from a direction in which the abutting member moves.

6. The image reading apparatus according to claim 1, wherein the abutting member is provided to be able to retract by moving in a direction different from a direction in which the cam is made to move.

\* \* \* \* \*